United States Patent
Kitahara

(10) Patent No.: US 8,566,629 B2
(45) Date of Patent: Oct. 22, 2013

(54) INFORMATION PROCESSING APPARATUS AND METHOD OF OPERATION OF DATA TRANSFER CIRCUIT

(75) Inventor: Yoshihiro Kitahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 209 days.

(21) Appl. No.: 12/957,844

(22) Filed: Dec. 1, 2010

(65) Prior Publication Data

US 2011/0131435 A1    Jun. 2, 2011

Related U.S. Application Data

(63) Continuation of application No. PCT/JP2008/060224, filed on Jun. 3, 2008.

(51) Int. Cl.
*G06F 1/32* (2006.01)

(52) U.S. Cl.
USPC ............ 713/324; 713/320; 713/322; 713/601

(58) Field of Classification Search
USPC .......... 713/300, 320, 322, 323, 324, 600, 601
See application file for complete search history.

(56) References Cited

U.S. PATENT DOCUMENTS

| | | | | |
|---|---|---|---|---|
| 7,188,263 | B1* | 3/2007 | Rubinstein et al. | 713/300 |
| 7,426,597 | B1* | 9/2008 | Tsu et al. | 710/307 |
| 2007/0150762 | A1* | 6/2007 | Sharma et al. | 713/300 |
| 2008/0304519 | A1* | 12/2008 | Koenen et al. | 370/477 |

FOREIGN PATENT DOCUMENTS

| | | |
|---|---|---|
| JP | 5-334107 | 12/1993 |
| JP | 11-27292 | 1/1999 |
| JP | 2002-259327 | 9/2002 |
| JP | 2004-320609 | 11/2004 |

OTHER PUBLICATIONS

International Search Report for PCT/JP2008/060224 mailed Sep. 16, 2008.

* cited by examiner

*Primary Examiner* — Paul Yanchus, III
(74) *Attorney, Agent, or Firm* — Staas & Halsey LLP

(57) ABSTRACT

An information processing apparatus transferring data between at least a plurality of processors through first and second routes running through first and second data transfer circuits, which retires the first and second routes so as to reduce the power consumption under the control of a system control device. The system provides a unit for measuring the amounts of data transfer on the first and second routes and measures the usage rates of the first and second routes. It monitors the measured usage rates by the system control device and, when the usage rates are below a predetermined value, controls the first or second data transfer circuit to make it retire the first or second route.

14 Claims, 27 Drawing Sheets

⟷ USED BUS
⟵--⟶ RETIRED BUS

US 8,566,629 B2

INFORMATION PROCESSING APPARATUS AND METHOD OF OPERATION OF DATA TRANSFER CIRCUIT

CROSS-REFERENCE TO RELATED APPLICATION

This application is a continuation application based on International Application No. PCT/JP2008/060224, filed on Jun. 3, 2008, the contents being incorporated herein by reference.

FIELD

The embodiments discussed herein relate to an information processing apparatus provided and a method of operation of a data transfer circuit. Furthermore, they relate to a computer readable memory containing therein an operating program for the data transfer circuit.

BACKGROUND

In recent years, there has been rising demand for an information processing apparatus (server) of a multiprocessor configuration having a data processing unit mounting a plurality of processors, that is, a system board (SB), and transferring data between a plurality of SBs or between an SB and an input/output control unit (IOU) to which an I/O device is connected, where the system (server) is provided with at least a first route (bus) for data communication, a second route (bus) for data communication, and a first data transfer circuit (crossbar unit) and second data transfer circuit (crossbar unit) able to suitably switch or close down these routes for data communications.

According to such a configuration of an information processing apparatus, when a fault occurs in one of the first and second route, the other communication route is used to back up the data transfer of the faulty route. Due to this, the reliability is improved. Further, it is also possible to increase the processing capability of the information processing apparatus (achieve higher throughput) by simultaneously using both the first and second routes. The present invention relates to the reduction of power or saving of power in such an information processing apparatus.

Note that, as examples of the known art relating to power saving designs, there are the "communication control device" of Patent Document 1, the "system buffer control device" of Patent Document 2, etc.

Patent Document 1: Japanese Laid-Open Patent Publication No. 11-27292

Patent Document 2: Japanese Laid-Open Patent Publication No. 5-334107

In the information processing apparatus of the related art, at the time of ordinary operation, the first and second routes (buses) are both simultaneously placed in the operating state. For this reason, the first and second data transfer circuits (crossbar units) are both constantly supplied with power and clocks unless a fault occurs in one of them.

That is, regardless of the magnitude of the data processing rate required in an information processing apparatus, the first and second data transfer circuits are constantly in a power consuming state.

SUMMARY

Accordingly, it is a first object of the present embodiments to provide an information processing system enabling the power consumption to be reduced during ordinary operation. Further, it is a second object of the present embodiments to provide a method of operation of a data transfer circuit and a computer readable medium containing therein an operating program.

To achieve the above object, the information processing apparatus disclosed in the present specification is provided with at least first and second routes transferring first and second systems of data between a plurality of data processing units (SB, IOU) and first and second data transfer circuits switching between the first and second routes. Furthermore, the information processing apparatus comprises a first data packet counting unit that counts a first data transfer amount of data of a first part transferred over the first route and a second data packet counting unit that counts a second data transfer amount of data of a second part transferred over the second route.

Here, the system finds a total of the first data transfer amount and the second data transfer amount and, when judging that the total becomes smaller than a preset predetermined amount, retires either the first route or the second route. That is, the system temporarily designates the retired route as "not-in-service". Here, the supply of at least the clock among the clock and power is stopped to the data transfer circuit which is connected to the retired route.

DESCRIPTION OF EMBODIMENTS

The information processing apparatus disclosed in the specification is provided with a monitoring unit (data packet counting unit) that uses a data packet counting unit to monitor an amount of data transfer over a route and uses this monitoring unit to monitor a "usage rate" of the route used for the data transfer. When the route (bus) usage rate is high, the system simultaneously uses two routes in parallel as usual and maintains a high throughput.

On the other hand, when the route (bus) usage rate becomes low, it is not necessary to set both of the first and second routes simultaneously in the active state (operating state). Therefore, if retiring one of the routes and setting it in an inactive state, so long as the state continues, that is, so long as in the low route usage rate state, the clock is not supplied to the data transfer circuit which is connected to the retired route, in which the power consumption is reduced. If the low route usage rate continues for a long time, it is also possible to stop the supply of power to the data transfer circuit (the clock is of course stopped). At this time, the effect of reduction of the power becomes much greater.

A further effect is as follows. This further effect is that the above monitoring unit (data packet counting unit) does not have to be newly prepared for realizing the information processing apparatus.

This takes note of the fact that it is possible to utilize an existing "performance analyzer" originally embedded as a monitoring unit, in the information processing apparatus.

In general, the performance analyzer is used at the time of evaluation of performance or at the time of verification in the development process. The performance analyzer is not normally used after the information processing apparatus begins actual operation at the user side. In the present information processing apparatus and method of operation of a data transfer circuit, a performance analyzer is utilized so as to eliminate the need for introducing a new circuit, since it is not used for the actual operation.

However, to make the performance analyzer function as a "counting unit", control by a later explained system control device (service processor: SVP) further becomes necessary. The SVP further manages the settings of the system, control of the power/clock supply unit, and other system control of the information processing apparatus.

Figure 1:
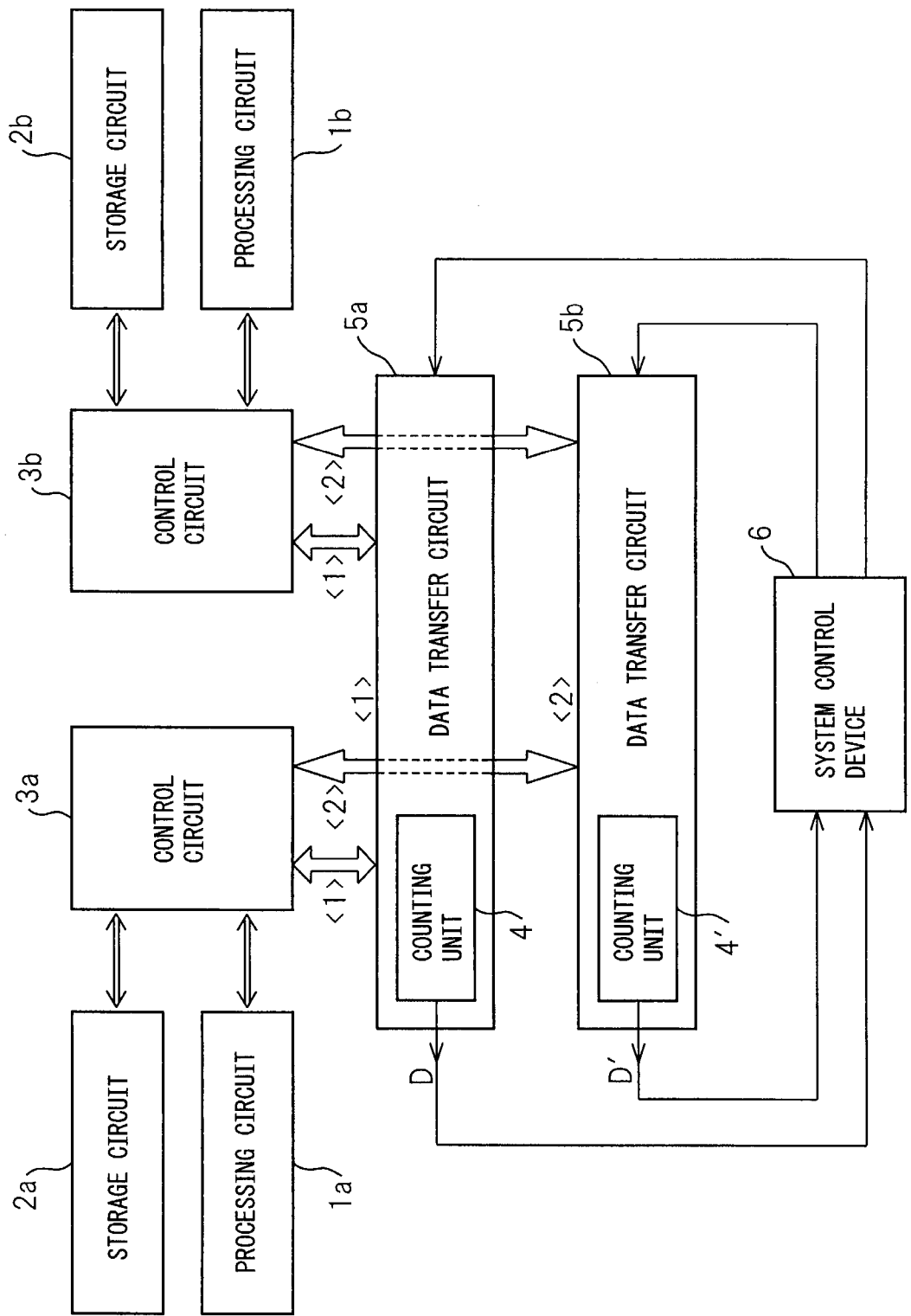
FIG. 1 is a view illustrating an information processing apparatus according to an embodiment.

FIG. 1 is a view illustrating an information processing apparatus according to an embodiment. The information processing system illustrated in the figure includes first and second control circuits 3a and 3b which transfer data with each other through first and second data transfer paths 5a and 5b. The first and second control circuits 3a and 3b respectively are connected with the first and second processing circuits 1a and 1b and first and second storage circuits 2a and 2b.

The system control device 6 controls the system, as a whole, and determines whether or not the retirement is needed.

That is, the information processing apparatus illustrated in the FIG. 1 has (i) a first control circuit 3a that is connected to a first processing circuit 1a and a first storage circuit 2a, (ii) a second control circuit 3b connected to a second processing circuit 1b and a second storage circuit 2b, (iii) a first data transfer circuit 5a that transfers data between the first control circuit 3a and second control circuit 3b through a first route <1> and is provided with a first counting unit 4 that counts a first data transfer amount D between the first control circuit 3a and second control circuit 3b, (iv) a second data transfer circuit 5b that transfers data between the first control circuit 3a and second control circuit 3b through a second route <2> and is provided with a second counting unit 4' that counts a second data transfer amount D' between the first control circuit 3a and second control circuit 3b, and (v) a system control device 6 that makes the first data transfer circuit 5a retire the first route <1> or makes the second data transfer circuit 5b retire the second route <2> when the total of the first data transfer amount D and the second data transfer amount D', that is, a total value, is smaller than a first threshold value (TH1).

Figure 2:
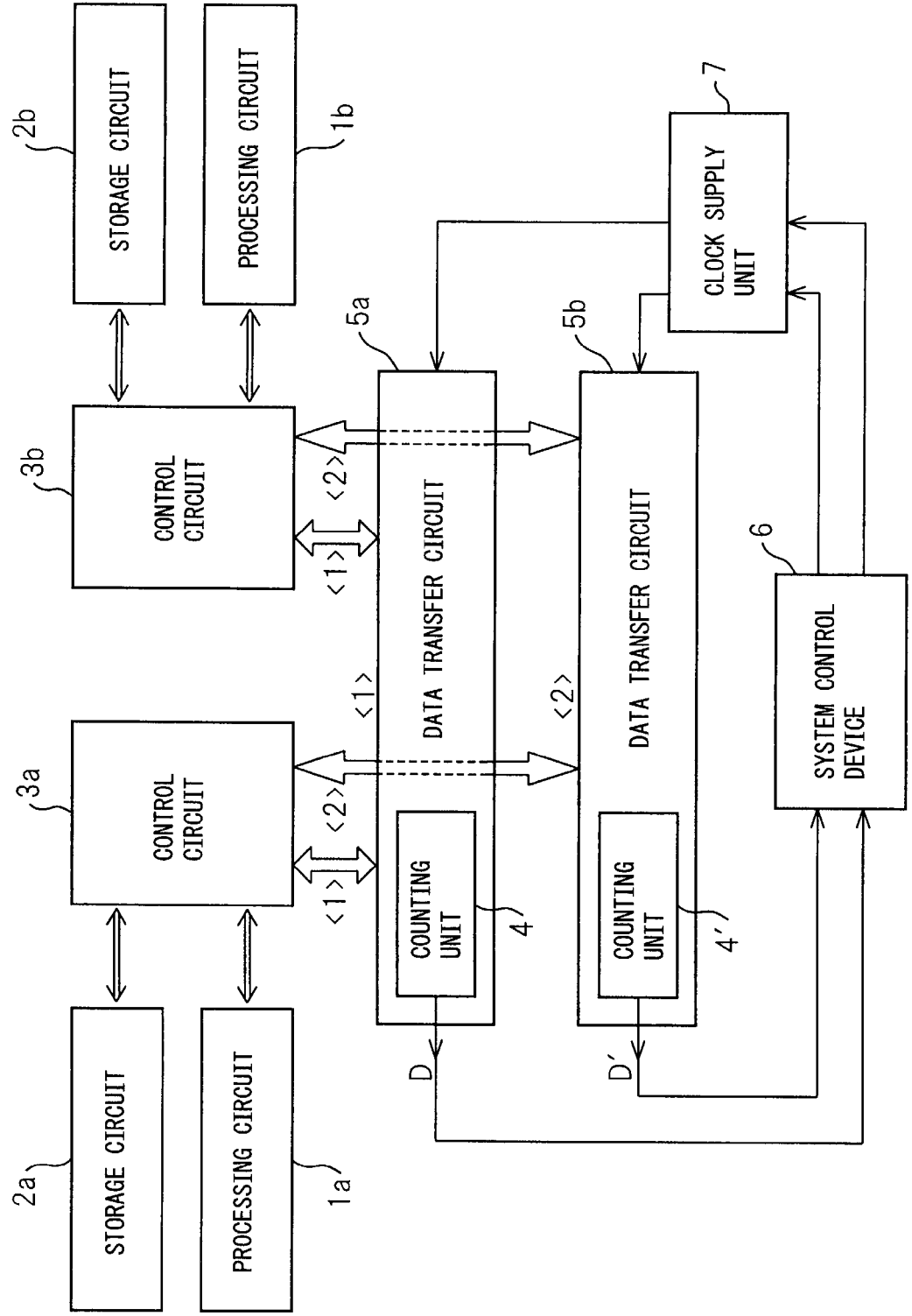
FIG. 2 is a view illustrating an example of retirement by stopping the supply of a clock in FIG. 1.

FIG. 2 is a view illustrating an example of retirement which is performed by stopping the supply of a clock in FIG. 1. For this, a clock supply unit 7 is further added to the configuration of FIG. 1.

Thus, the information processing apparatus further has a clock supply unit 7 that supplies a clock to the first and second data transfer circuits 5a and 5b. The system control device 6 makes the clock supply unit 7 stop the supply of the clock to the first data transfer circuit 5a when making the first data transfer circuit 5a retire the first route <1> or makes the clock supply unit 7 stop the supply of the clock to the second data transfer circuit 5b when making the second data transfer circuit 5b retire the second route <2>.

Figure 3:
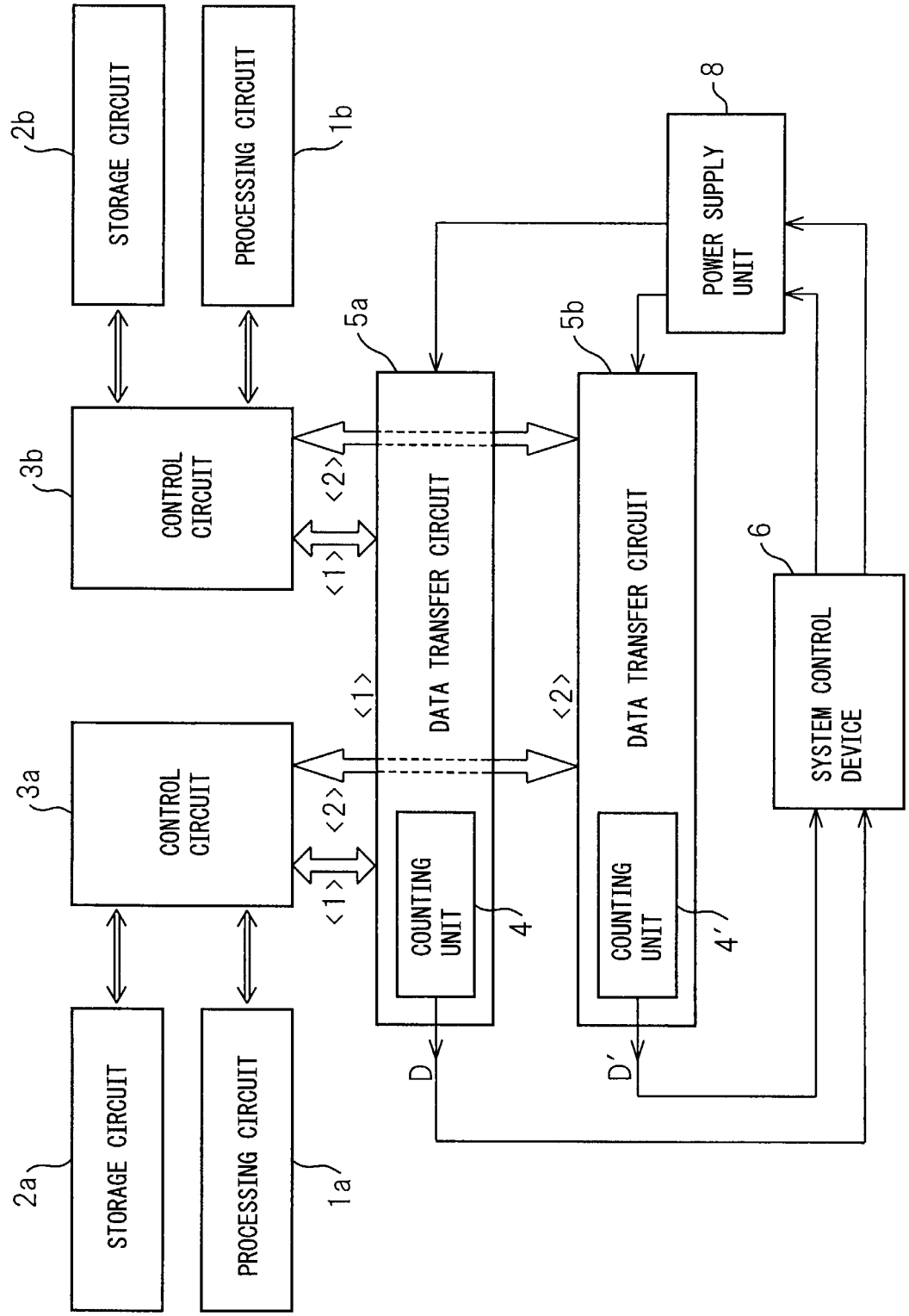
FIG. 3 is a view illustrating an example of retirement by stopping the supply of power in FIG. 1.

FIG. 3 is a view illustrating an example of retirement which is performed by stopping the supply of power in FIG. 1. For this, a power supply unit 8 is further introduced into the configuration of FIG. 1.

Thus, the information processing apparatus further has a power supply unit 8 that supplies power to the first and second data transfer circuits 5a and 5b. The system control device 6 makes the power supply unit 8 stop the supply of power to the first data transfer circuit 5a when making the first data transfer circuit 5a retire the first route <1> or makes the power supply unit 8 stop the supply of power to the second data transfer circuit 5b when making the second data transfer circuit 5b retire the second route <2>.

In FIG. 1 to FIG. 3, the case of reset from the above "retired" state to the "ordinary" state is as follows:

The information processing system which is in the retired state activates either the first or second route <1>/<2> which the system control device 6 made the first or second data transfer circuit 5a/5b retire, when the total value of the first data transfer amount D and second data transfer amount D', is larger than a second threshold value TH2.

In this case, in the information processing apparatus, the second threshold value TH2 is set larger than the first threshold value TH1 (TH1<TH2).

Note that, the first and second threshold values TH1 and TH2 will be explained in detail later.

Figure 4:
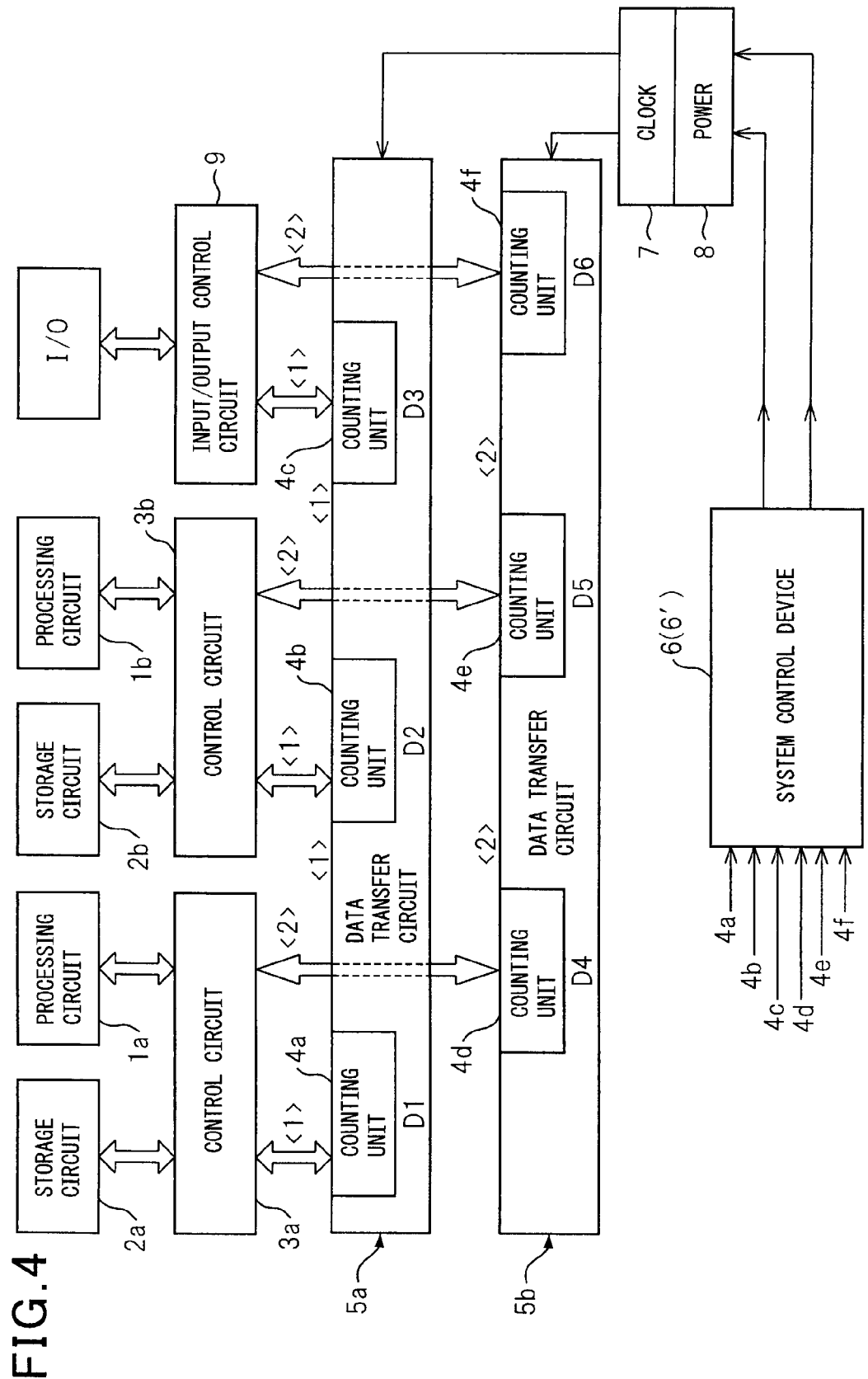
FIG. 4 is a view illustrating an information processing apparatus according to another embodiment.

FIG. 4 is a view showing an information processing apparatus according to another embodiment. Component elements similar to the component elements illustrated in FIG. 1 to FIG. 3 are assigned the same reference numerals or symbols. Therefore, the input/output device I/O and the input/output control unit 9 controlling this device I/O are added to FIG. 1 to FIG. 3. Further, the above-mentioned counting units (4, 4') are set as 4a, 4b, and 4c at respective input/output ends of the data between the first and second control circuits 3a and 3b and input/output control unit 9 and the first data transfer circuit 5a. Similarly, they are set as 4d, 4e, and 4f at respective input/output ends of data between the first and second control circuits 3a and 3b and input/output control unit 9 and the second data transfer circuit 5b. Note that in the figure, both the clock supply unit 7 and the power supply unit 8 are described integrally.

Thus, the information processing apparatus illustrated in FIG. 4 has (i) a first control circuit 3a that is connected to a first processing circuit 1a and a first storage circuit 2a, (ii) a second control circuit 3b that is connected to a second processing circuit 1b and a second storage circuit 2b, (iii) an input/output control unit 9 that is connected to an input/output device I/O, (iv) a first data transfer circuit 5a that transfers data between the first control circuit 3a, second control circuit 3b, and input/output control unit 9 through first routes <1> and is provided with a first counting unit 4a that counts a first data transfer amount D1 for the first control circuit 3a, a second counting unit 4b that counts a second data transfer amount D2 for the second control circuit 3b, and a third counting unit 4c that counts a third data transfer amount D3 for the input/output control unit 9, (v) a second data transfer circuit 5b that transfers data between the first control circuit 3a, second control circuit 3b, and input/output control unit 9 through second routes <2> and is provided with a fourth counting unit 4d that counts a fourth data transfer amount D4 for the first control circuit 3a, a fifth counting unit 4e that counts a fifth data transfer amount D5 for the second control circuit 3b, and a sixth counting unit 4f that counts a sixth data transfer amount D6 for the input/output control unit 9.

Furthermore, the information processing apparatus has (vi) a system control device that makes the first data transfer circuit 5a retire the first route <1> or makes the second data transfer circuit 5b retire the second route <2>, when any of a total of the first data transfer amount D1 and fourth data transfer amount D4, that is, a first total value (S1), a total of the second data transfer amount D2 and fifth data transfer amount D5, that is, a second total value (S2), and a total of the third data transfer amount D3 and sixth data transfer amount D6, that is, a third total value (S3), is smaller than a first threshold value TH1. As another method, the system may (vi) make the first data transfer circuit 5a retire the first route <1> or make the second data transfer circuit 5b retire the second route <2>, when all of a total of the first data transfer amount D1 and fourth data transfer amount D4, that is, a first total value (S1), a total of the second data transfer amount D2 and fifth data transfer amount D5, that is, a second total value (S2), and a total of the third data transfer amount D3 and sixth data transfer amount D6, that is, a third total value (S3), are smaller than the first threshold value TH1.

In FIG. 4, the system control device 6' may perform a different retirement control operation from the system control device 6 in retirement control. That is, this system control device 6' makes the first data transfer circuit 5a retire the first route <1> or makes the second data transfer circuit 5b retire the second route <2>, when an average of the first to sixth data transfer amounts D1 to D6, that is, an average value (AV), is smaller than the first threshold value TH1.

The process of the method of operation of the data transfer circuit (5a, 5b) by the system control device 6 and 6' explained in FIG. 4 is illustrated by a flowchart.

Figure 5:
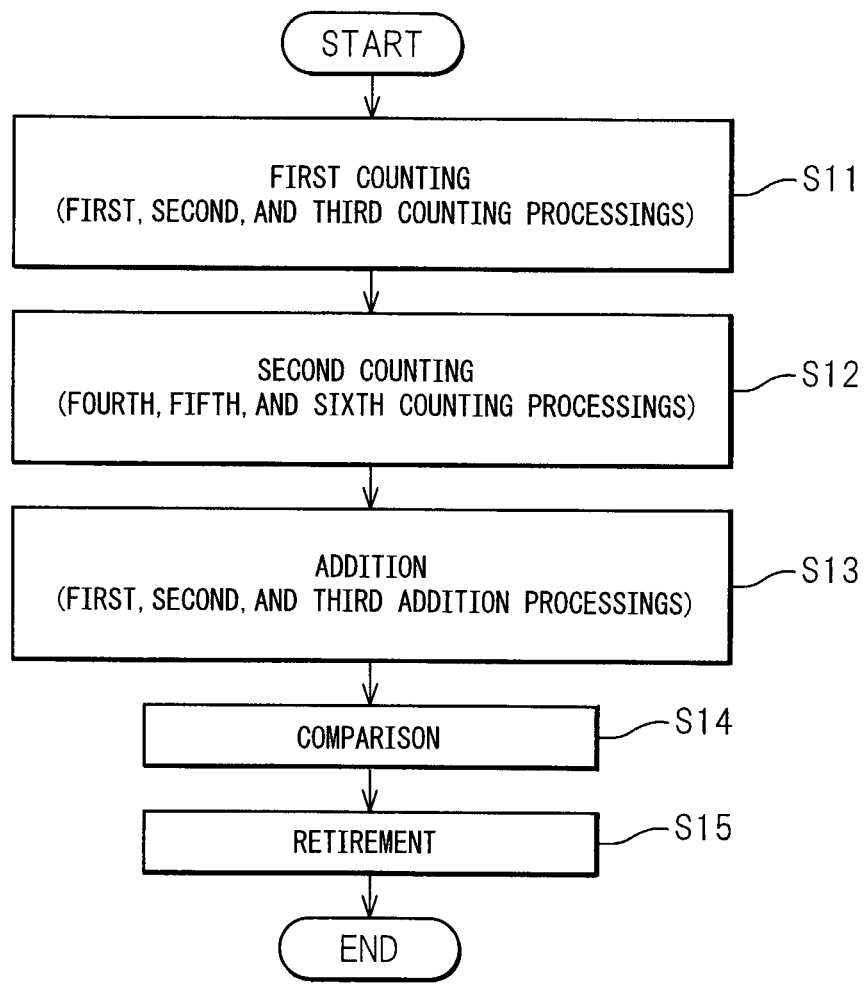
FIG. 5 is a flow chart illustrating a method of operation of a data transfer circuit by a system control device 6 of FIG. 4.
Figure 6:
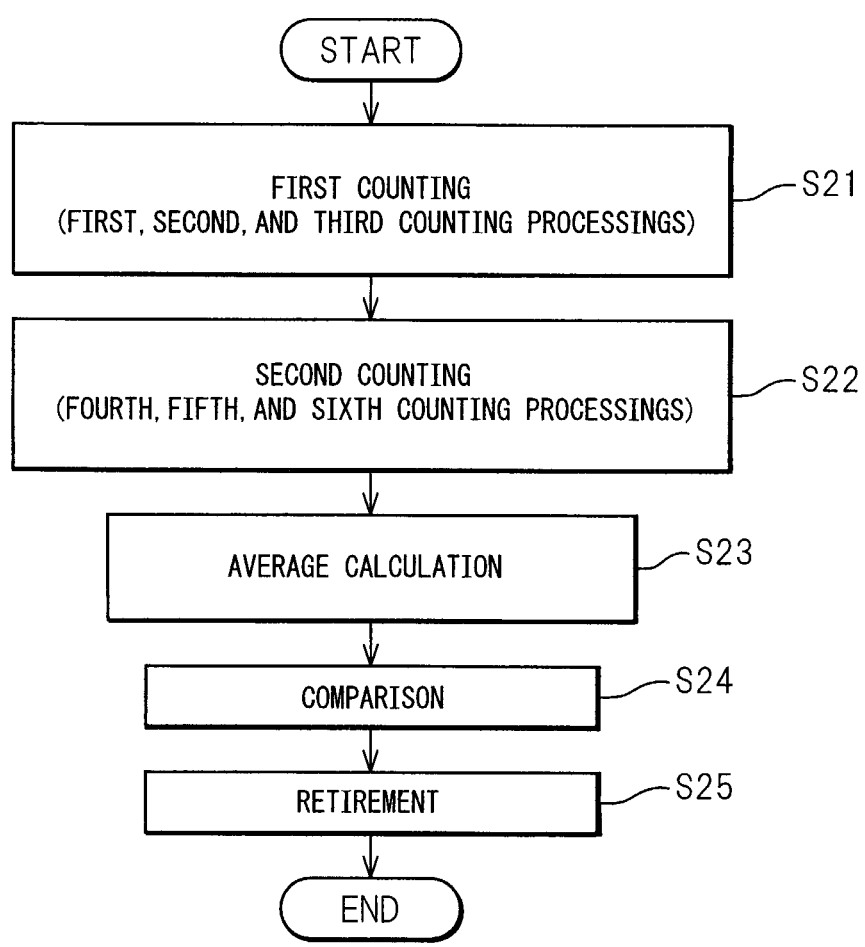
FIG. 6 is a flowchart illustrating an operating method of a data transfer circuit by a system control device 6' of FIG. 4.

FIG. 5 is a flowchart illustrating the method of operation of the data transfer circuit (5a, 5b) by the system control device 6 of FIG. 4, while FIG. 6 is a flowchart illustrating the method of operation of the data transfer circuit (5a, 5b) by the system control device 6' of FIG. 4, as an example.

First, referring to FIG. 5, the method includes:

step S11: for the first route <1>, a first counting process performing first counting processing that counts the first data transfer amount D1 for the first control circuit 3a, second counting processing that counts the second data transfer amount D2 for the second control circuit 3b, and third counting processing that counts the third data transfer amount D3 for the input/output control unit 9, step S12: for the second route <2>, a second counting process performing fourth counting processing that counts the fourth data transfer amount D4 for the first control circuit 3a, fifth counting processing that counts the fifth data transfer amount D5 for the second control circuit 3b, and sixth counting processing that counts the sixth data transfer amount D6 for the input/output control unit 9.

step S13: an addition process performing first addition processing that finds the first total value S1 of the first data transfer amount D1 and fourth data transfer amount D4, second addition processing that finds the second total value S2 of the second data transfer amount D2 and fifth data transfer amount D5, and third addition processing that finds the third total value S3 of the third data transfer amount D3 and sixth data transfer amount D6.

step S14: a comparison process comparing the first, second, and third total values S1, S2, and S3 with a predetermined threshold value TH, and step S15: a retirement process making the first data transfer circuit 5a retire the first route <1> or making the second data transfer circuit 5b retire the second route <2>, when any or the total value of all of the first, second, and third total values S1, S2, and S3 is smaller than the predetermined threshold value TH. As another method, it may make the first data transfer circuit 5a retire the first route <1> or make the second data transfer circuit 5b retire the second route <2>, when the total value of all of the first, second, and third total values S1, S2, and S3 is smaller than the predetermined threshold value TH.

Next, referring to FIG. 6, step S21: same as S11, step S22: same as S12 step S23: a calculation process finding the average value AV of the first, second, third, fourth, fifth, and sixth data transfer amounts (D1, D2, D3, D4, and D6).

step S24: a comparison process comparing the average value AV and the predetermined threshold value TH, and step S25: a retirement process making the first data transfer circuit 5a retire the first route <1> or making the second data transfer circuit 5b retire the second route <2>, when the average value AV is smaller than the predetermined threshold value TH.

The above explained embodiments will be illustrated by a specific example below.

Figure 7:
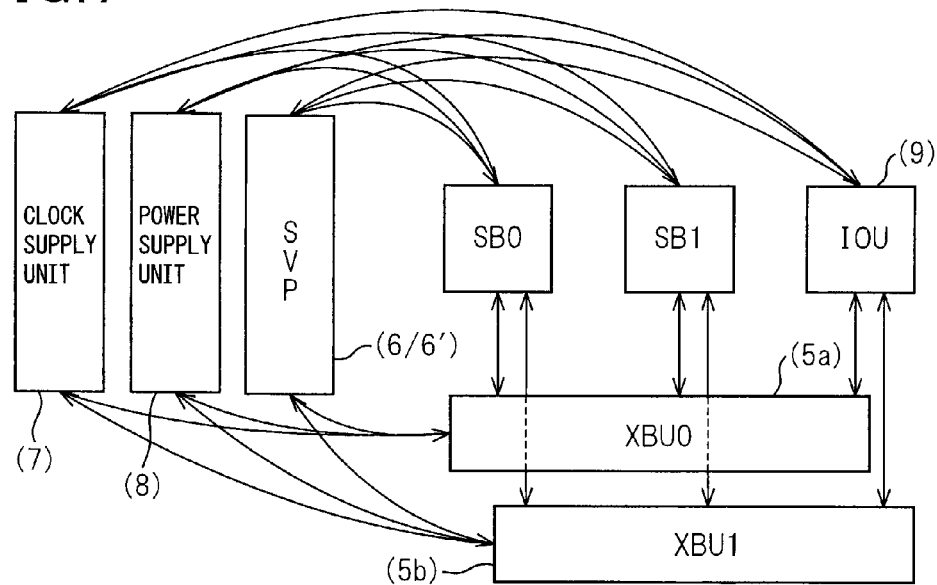
FIG. 7 is a view illustrating a specific example of an information processing apparatus illustrated in FIG. 4.

FIG. 7 is view showing a specific example of the information processing apparatus illustrated in FIG. 4. The system constitutes a server, as a whole.

This server is comprised of system boards SB, crossbar units XBU (5a, 5b in FIG. 4), an input/output control unit IOU (9 in FIG. 4), an SVP (service processor) (6, 6' in FIG. 4), a clock supply unit (7 in FIG. 4), and a power supply unit (8 in FIG. 4).

Between the SB and SB and the SB and IOU, two buses are connected. On these buses, there are crossbar units XBU0/1 for dividing the packets (transfer data) between the SB and SB and the IOU. By using the XBU0/1 to form a two-route configuration (<1>, <2> in FIG. 4), if a fault happens to occur on the XBU0, the bus (<1> or <2>) connected to this faulty XBU0 is retired and only the bus connected to the other normal XBU1 is used. Due to this, it is possible to continue the data processing, as is, which had proceeded up to then.

Figure 8:
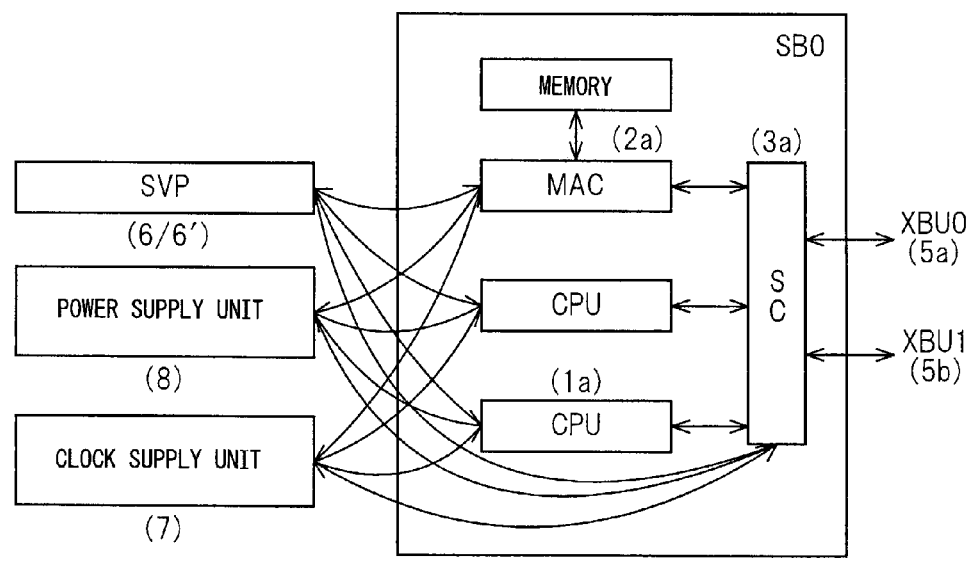
FIG. 8 is a view specifically illustrating an SB of FIG. 7.

FIG. 8 is a view specifically illustrating an SB of FIG. 7. Note that, the SB0 and SB1 of FIG. 7 have the same configuration and just the SB0 is illustrated as a representative example.

The SB0 is, for example, comprised of two CPUs (1a in FIG. 4), a memory access controller (MAC), a memory (2a in FIG. 4) and a system controller (SC) (3a in FIG. 4). The SC is connected, by buses, with the CPUs, the memory (through the MAC), and the crossbar modules in the XBU0/1 and controls communication among them. Note that the MAC controls the memory.

The CPU, MAC, and SC receive power from the power supply unit (8) and a clock from the clock supply unit (7), respectively. Further, these CPUs, MAC, and SC are connected with the SVP (6/6') by control buses.

Figure 9:
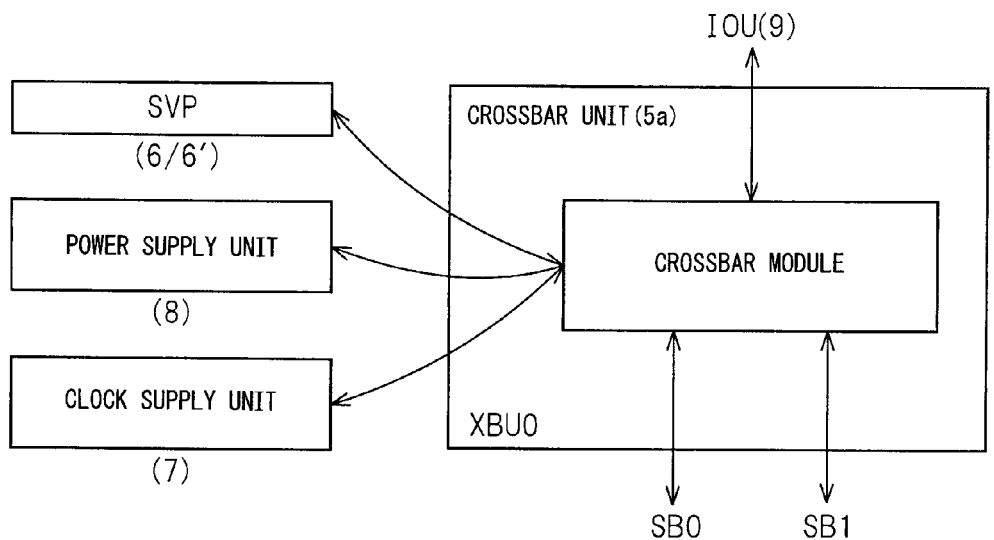
FIG. 9 is a view specifically illustrating a crossbar unit XBU0 of FIG. 7.

FIG. 9 is a view specifically illustrating a crossbar unit XBU. Note that the XBU0 and XBU1 have the same configuration, so XBU0 is illustrated as a representative example.

The XBU0 (5a) is configured including a crossbar module. The crossbar module is connected to the SCs (3a, 3b) in the SB0/1 and is connected to the I/O controller in the IOU (9) (see FIG. 10). The crossbar module is input with the packets from the SB0/1 or IOU and divides them to the destination SC or I/O controller.

Further, the crossbar module receives power from the power supply unit (8) and a clock from the clock supply unit (7) and is connected to the SVPs (6/6') by control buses.

Note that, the interface unit of the crossbar module has the above-mentioned performance analyzer (above-mentioned data packet counting unit) originally embedded in it so as to confirm how frequently buses are being used when evaluating and verifying a prototype. During actual operation, this performance analyzer is not used (explained before).

Figure 10:
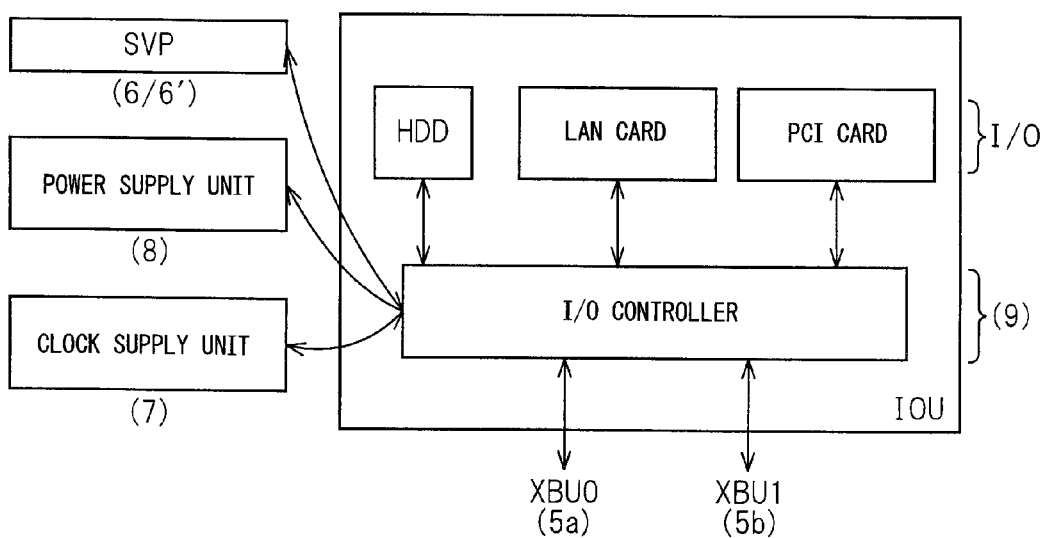
FIG. 10 is a view specifically illustrating an IOU of FIG. 7.

FIG. 10 is a view specifically illustrating an IOU of FIG. 7. This IOU is comprised of an I/O controller (9), an HDD in an input/output device I/O, a PCI card, a LAN card, etc. The I/O controller (9) is connected with the HDD, PCI card, and LAN card by buses, and, further, is connected with crossbar modules (FIG. 9) by buses, and controls communication among them.

Figure 11:
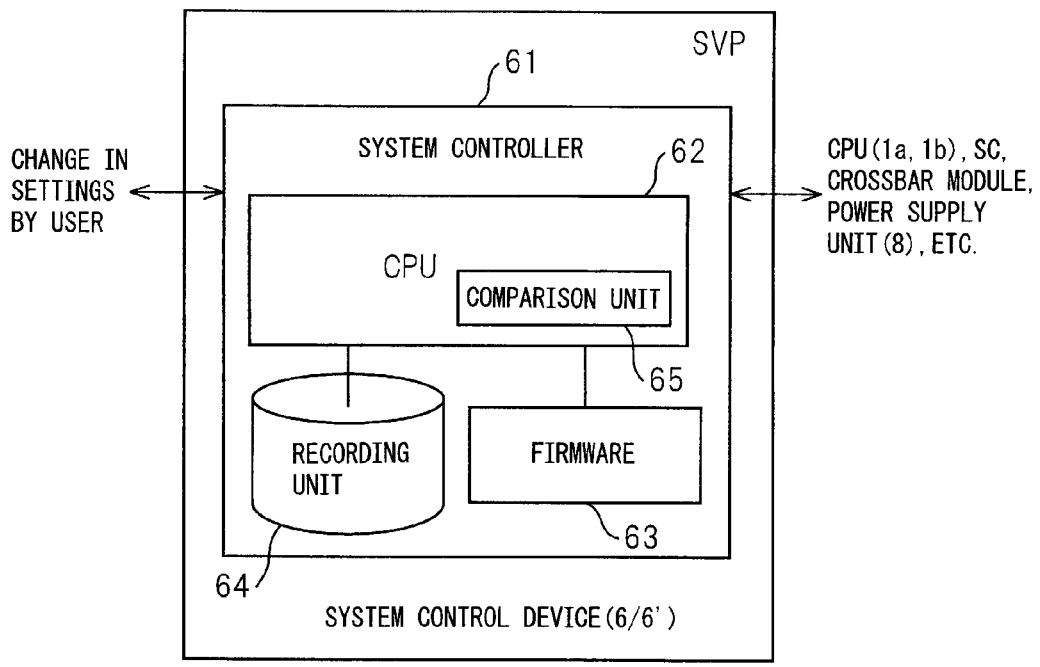
FIG. 11 is a view illustrating a specific example of an SVP (6/6') illustrated in FIGS. 7, 8, 9, and 10.

FIG. 11 is a view illustrating a specific example of a SVP (6/6') illustrated in FIGS. 7, 8, and 10. The SVP is comprised of a system control unit 61 having a CPU 62, firmware 63 operating on the CPU 62, and a recording unit 64 recording the settings of the system. The SB0/1, XBU0/1, IOU (9), clock supply unit (7), power supply unit (8), etc. are connected with the SVP of this figure by control buses. The firmware 63 is used to monitor and control these.

Further, an input/output interface unit is also provided to enable the user to change the system settings ("change in settings" of FIG. 11). Note that a comparison unit 65 performs the "comparison" of step S14 of FIG. 5 and step S24 of FIG. 6.

Figure 12:
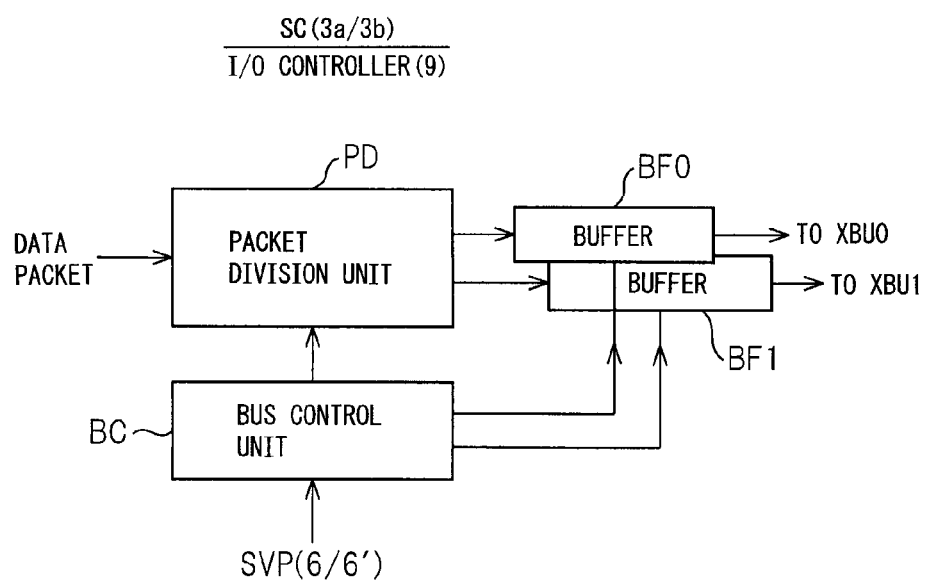
FIG. 12 is a view illustrating interface units with XBU0/1 provided in the SC of FIG. 8 and the I/O controller of FIG. 10.

FIG. 12 is a view illustrating the interface units with the XBU0/1 respectively provided in the SC of FIG. 8 and I/O controller of FIG. 10. Note that, both in an SC and in an XBU0/1, the interface units are configured the same.

Each of the output interface units of the SC and I/O controller connected to the XBU0/1 is comprised of a packet division unit PD dividing data packets to the XBU0/1, buffers BF0/1 temporarily holding the divided packets until output, and a bus control unit BC. The bus control unit BC is connected to the SVP (6/6'), packet division unit PD, and buffers BF0/1, which unit BC divides packets and controls the buffers in accordance with the instruction of the SVP.

Figure 13:
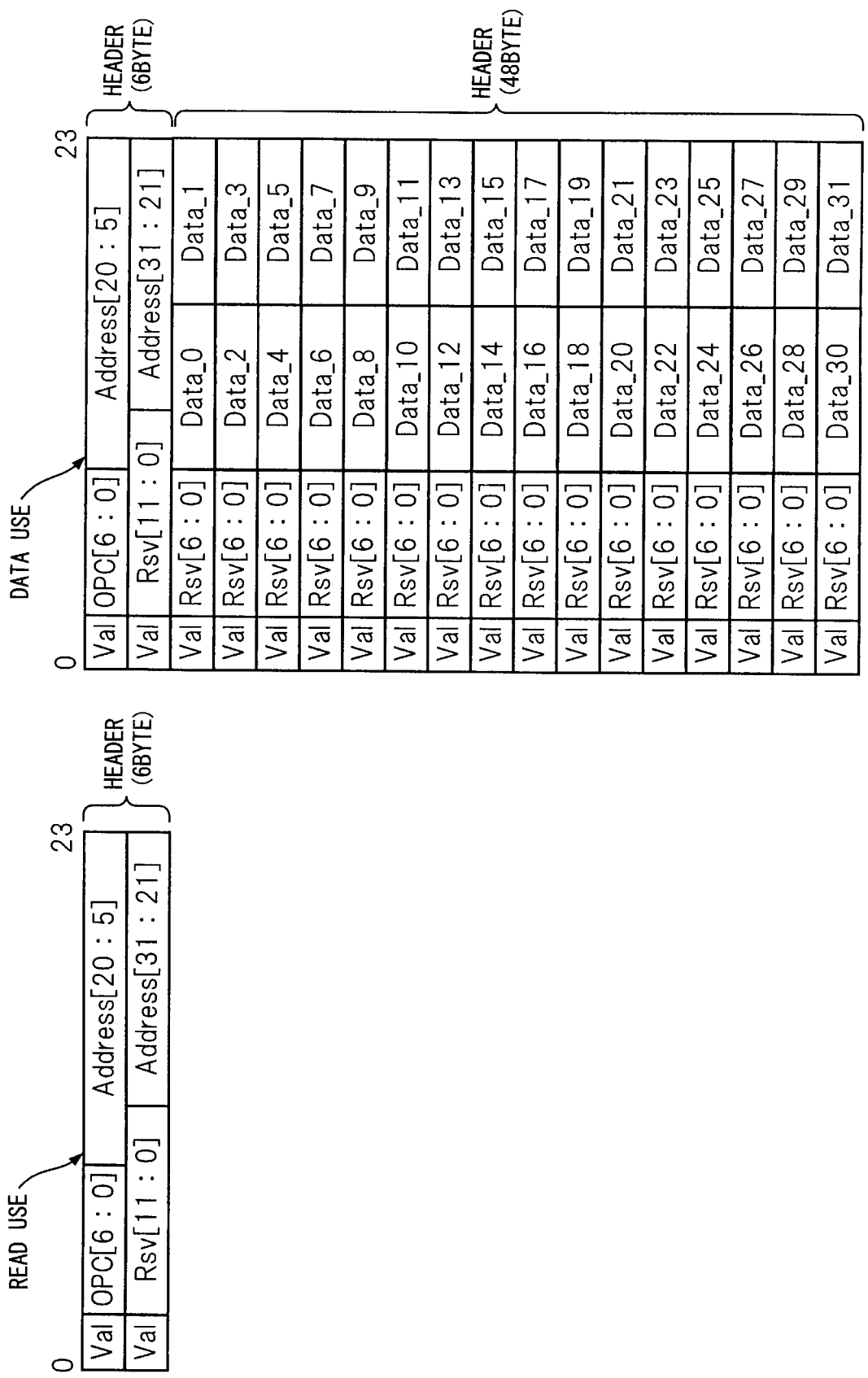
FIG. 13 is a view illustrating an example of a packet format of a data packet illustrated in FIG. 12.

FIG. 13 is a view showing an example of the packet format of the data packet illustrated in FIG. 12. An SB and XBU and an XBU and IOU are connected by 24-bit width buses and send 24 bits at a time every 1τ. Further, the communication, in this case, is performed in packet units. In this figure, examples of the packet formats for read use and data use are illustrated.

"Read use" illustrates, for example, the formats used when the CPUs (1a, 1b) request certain memory information etc., while "Data use" illustrates the formats used when sending the data for a read request to the CPU requesting the same. Each packet is comprised of an operation code (Opcode) [6:0] showing the type of the packet, Address [31:5], Data, etc.

Further, the Opcode in a packet defines the size of the packet. For example, in a read use packet, the size is 6 bytes, while in a data use packet, the size is 54 bytes.

Between an SB and XBU and between an IOU and XBU, as explained above, there are 24-bit width buses. Therefore, each packet is divided into several sections of 3 bytes each and sent. Further, for every 3 bytes, a "valid" bit showing that the data is valid (or invalid) is included. Note that, in the figure, "Val" indicates "Valid", "OPC" indicates "Opcode", and "Rsv" indicates "Reserved.

Three bytes of data transmitted over a 24-bit wide bus are defined here as a "data set". A read use packet is comprised of two data sets, while a data use packet is comprised of 18 data sets.

Below, the operation of an information processing apparatus (server of FIG. 7 to FIG. 12) will be explained.

Figure 14:
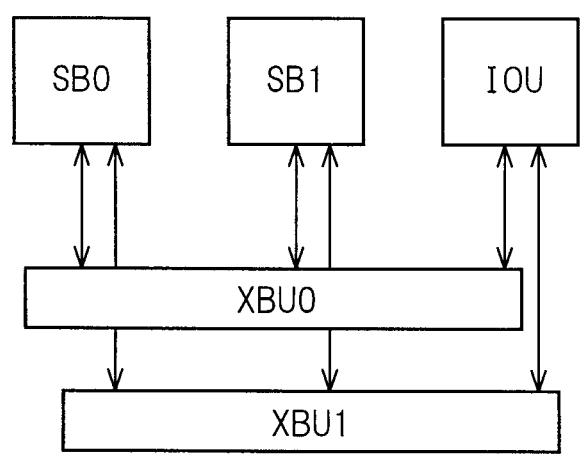
FIG. 14 is a view illustrating a general system configuration at the time of ordinary operation of a server.

FIG. 14 is a view illustrating the general system configuration at the time of an ordinary operation of a server. In this figure, the numbers of the SBs and IOUs are made two SBs and one IOU, but greater numbers than these may also be mounted.

In general operation, the two buses (communication route) connected to the XBU0/1 are simultaneously used. This is so as to secure the throughput between one SB and another SB and between an SB and the IOU and to enable continued operation by just one bus when a fault occurs at one XBU or bus (explained earlier).

Each packet in communication between one SB and another SB or between an SB and the IOU passes through one of the buses connected to the XBU0/1. Which bus to go through is determined by the packet division unit at the side transmitting the packet (see PD of FIG. 12). The packet division unit PD determines the bus to be used referring to a predetermined bus in the address part of the packet. For example, when referring to the bit [5] of the address part and this bit [5] is "0", the packet is allocated to the bus connected to the XBU0, while when "1", it is allocated to the bus connected to the XBU1.

In such a server, even at the time of actual operation, the already explained performance analyzers embedded in the input/output interface units of the crossbar modules are used as the bus usage rate measurement circuits (counting units 4a to 4f) so as to measure the usage rates of buses. The measured bus usage rates and a preset threshold value for transition from ordinary operation to a bus retirement operation are compared. The result of comparison is used to determine whether to continue ordinary operation or switch to a bus retirement operation.

When determining to switch to a bus retirement operation at the time of ordinary operation, either of the buses connected to the XBU0/1 is selected and retired. Due to this, to supply of power or supply of a clock to the XBU0 (or XBU1) connected to the retired (not-in-service) bus is stopped. Thus, it is possible to dynamically reduce the power consumption during the server operation.

The "ordinary operation" here is an operation simultaneously using two buses connected between one SB and another SB and between an SB and the IOU. Further, the "bus retirement operation" is an operation using only one of the two buses connected between one SB and another SB and an SB and the IOU.

Figure 15:
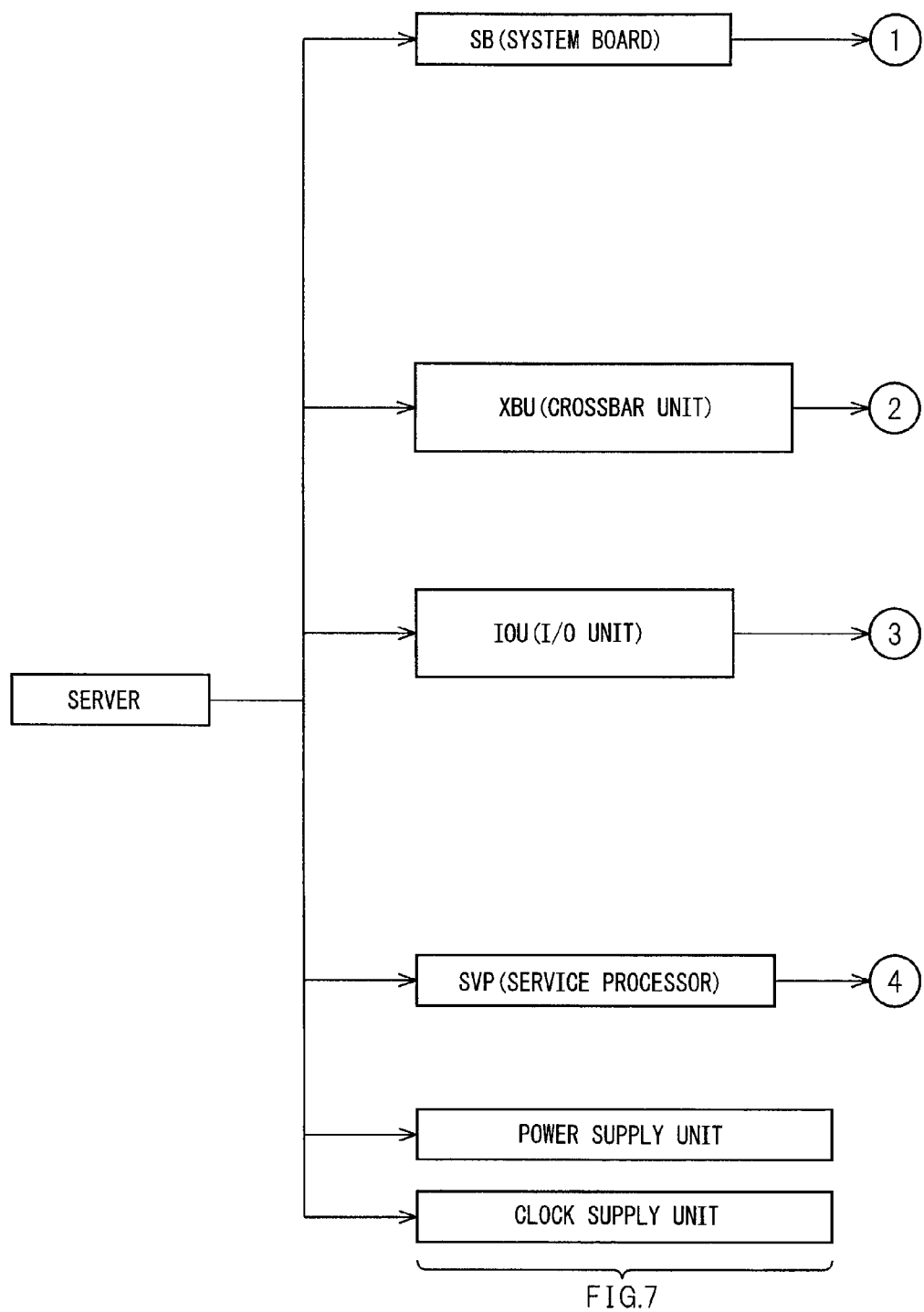
FIG. 15 is a view (Part 1) illustrating an overall configuration of a server including the component elements shown in FIG. 7 to FIG. 12.
Figure 16:
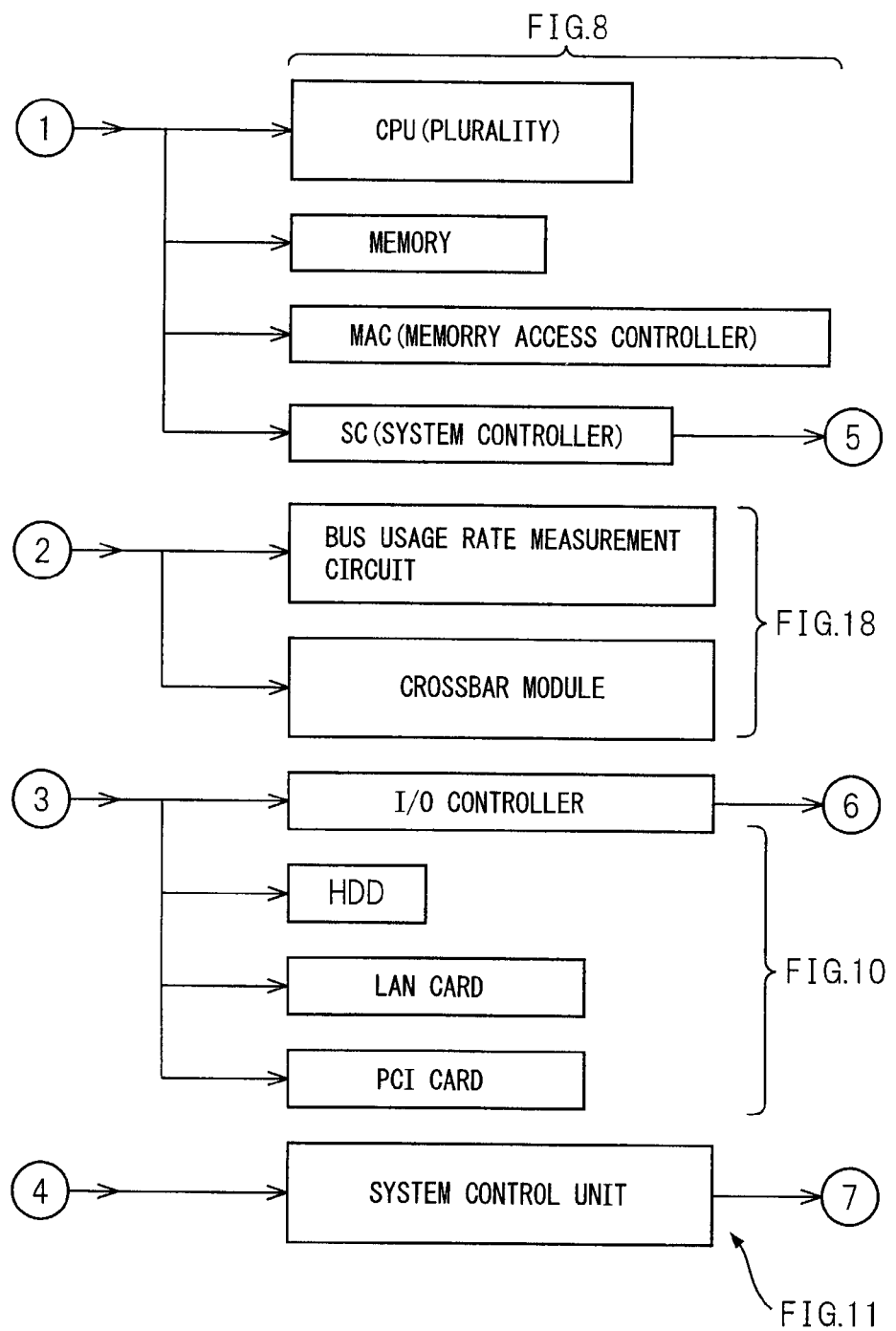
FIG. 16 is a view (Part 2) illustrating an overall configuration of a server including the component elements shown in FIG. 7 to FIG. 12.
Figure 17:
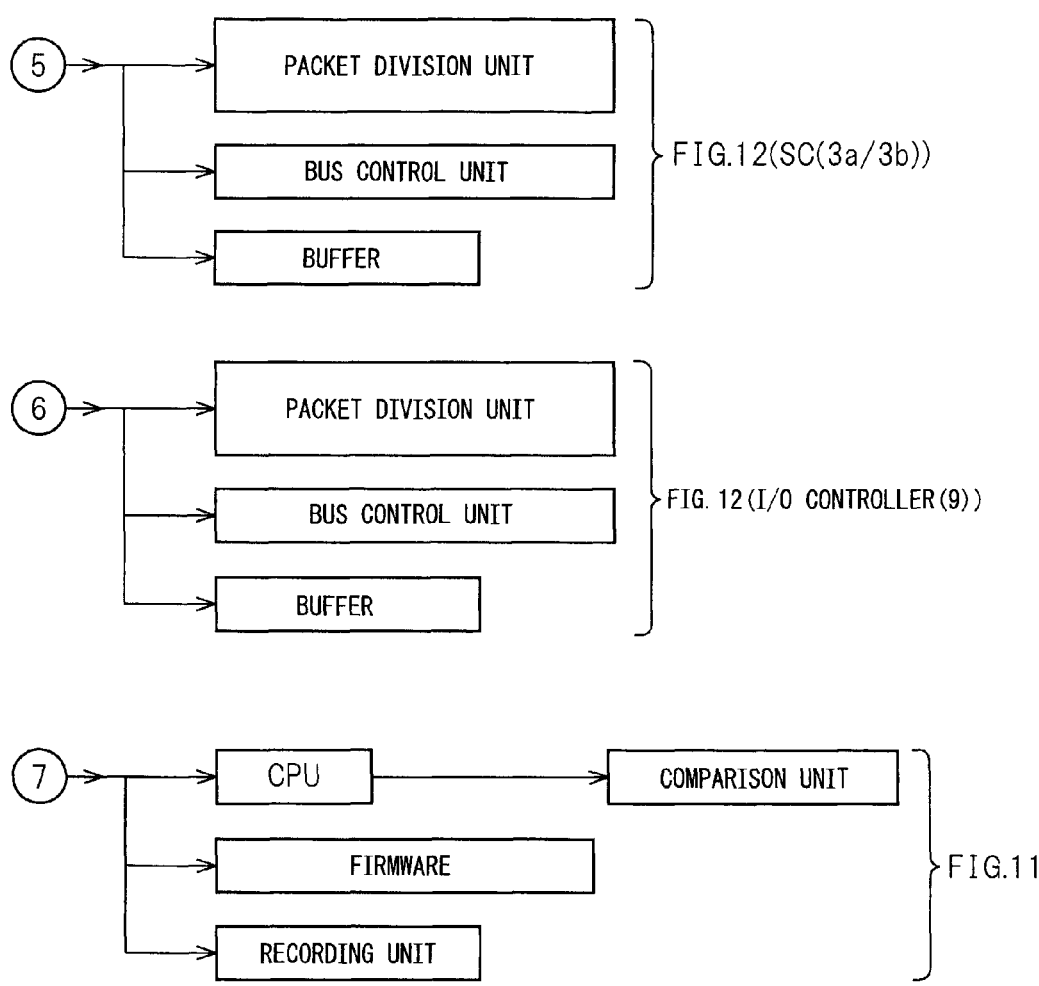
FIG. 17 is a view (Part 3) illustrating an overall configuration of a server including the component elements shown in FIG. 7 to FIG. 12.

FIG. 15 is a view (Part 1) illustrating the overall configuration of a server of the component elements shown in FIG. 7 to FIG. 12, FIG. 16 is the same view (Part 2), and FIG. 17 is the same view (Part 3). Note that the numbers of the figures in which the component elements are specifically illustrated, such as FIG. 7, FIG. 8 . . . . , are also shown together. The part to be particularly noted here is the connection between the bus usage rate measurement circuits (FIG. 16) and the SVP (FIG. 15). Also, it is the connection between the SVP (FIG. 15) and the power supply unit/clock supply unit (FIG. 15) and crossbar unit (FIG. 15).

Figure 18:
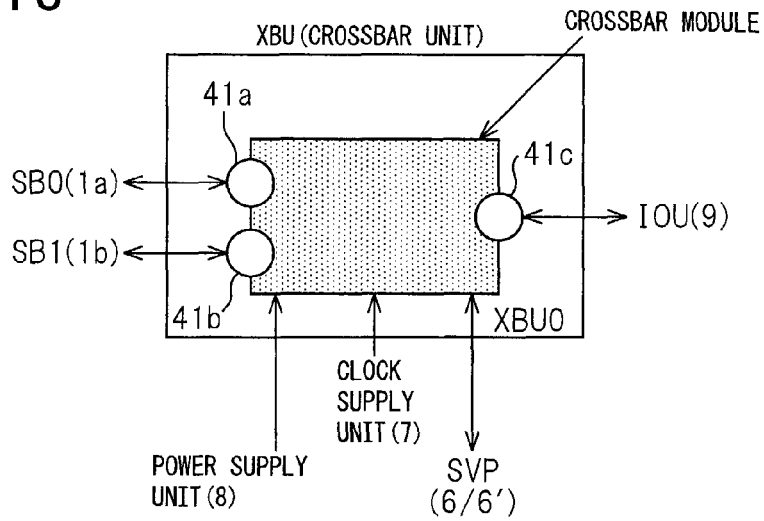
FIG. 18 is a view illustrating an example of a crossbar unit provided with bus usage rate measurement circuits (counting units)

As illustrated in FIG. 9, an XBU is comprised of a crossbar module. An input packet is allocated to the in the destination SB or the I/O controller in the destination IOU. More preferably, this is as shown in FIG. 18. FIG. 18 shows an example of a crossbar unit provided with bus usage rate measurement circuits (counting units). The input/output interface units of the crossbar module illustrated in FIG. 18 are provided with bus usage rate measurement circuits 41a to 41c for measuring the bus usage rates. Reference numerals 41a to 41c correspond to 4a to 4c of FIG. 4.

Figure 19:
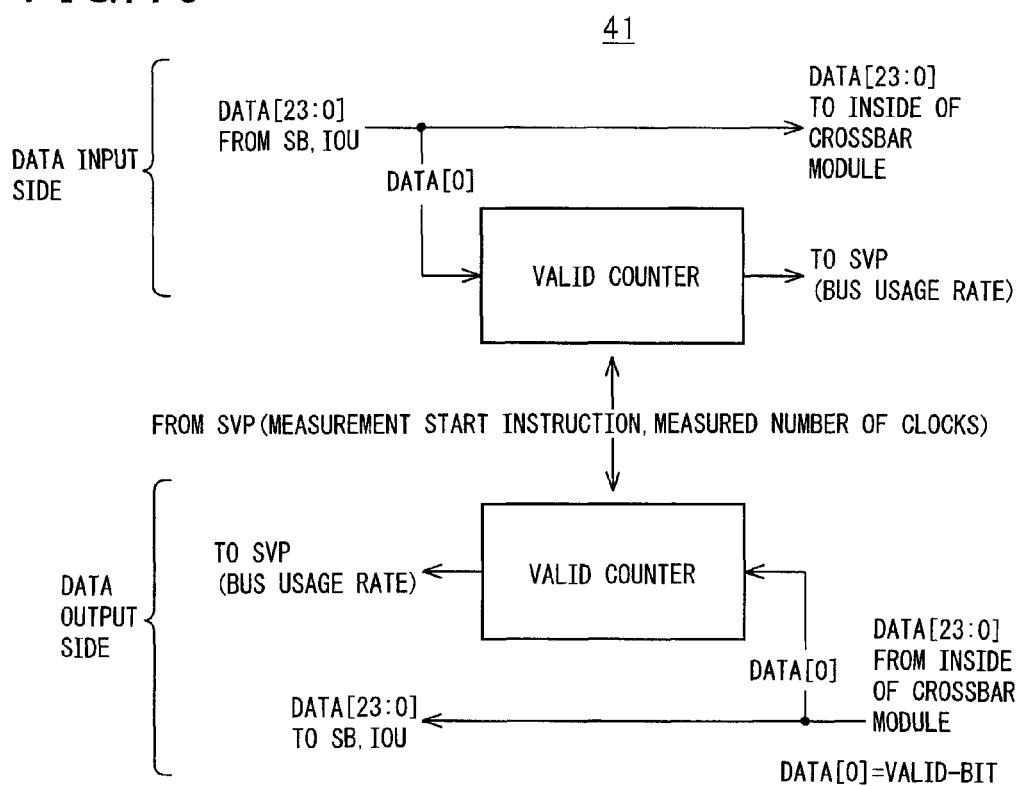
FIG. 19 is a view illustrating an example of the configuration of a bus usage rate measurement circuit 41.

FIG. 19 is a view illustrating an example of the configuration of a bus usage rate measurement circuit 41. The bus usage rate measurement circuit 41 is comprised of a "valid" counter which receives the measured number of clocks sent from the system control unit 61 of the SVP (FIG. 11) and a measurement start instruction so as to count the number of valid data sets passing through the counter from the time of a measurement start instruction to the elapse of the measured number of clocks. Further, the circuit 41 calculates "the valid count number/measured number of clocks" so as to obtain the usage rate per unit clock and sends this to the system control unit 61.

The bus usage rate measurement circuit 41 can be set in not only the input/output interface unit of the XBU, but also at the input/output interface units of the SBs and IOU both connected to the XBUs. Note that at the crossbar module (FIG. 18), the SCs in the SBs and the I/O controller in the IOU are connected by buses. Further, power is supplied from the power supply unit 8, while a clock is supplied from the clock supply unit 7. Furthermore, the SVP is connected with the crossbar module by the control bus.

Figure 20:
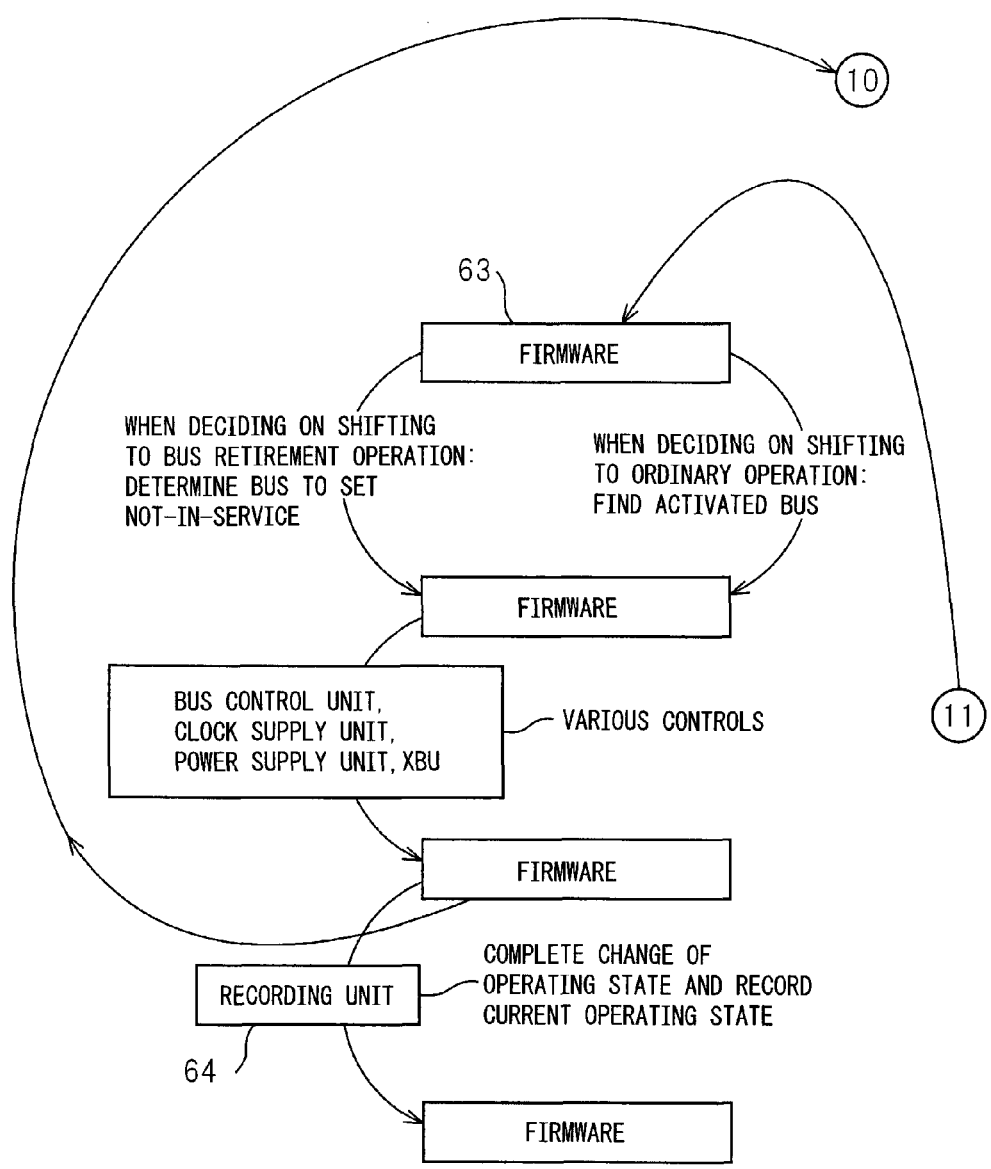
FIG. 20 is a state transition diagram (Part 1) seen from firmware 63.

The SVP performs the monitoring and control by the firmware 63 as explained in FIG. 11. FIG. 20 is a state transition diagram (Part 1) seen from the firmware 63, while FIG. 21 is the same view (Part 2).

Figure 21:
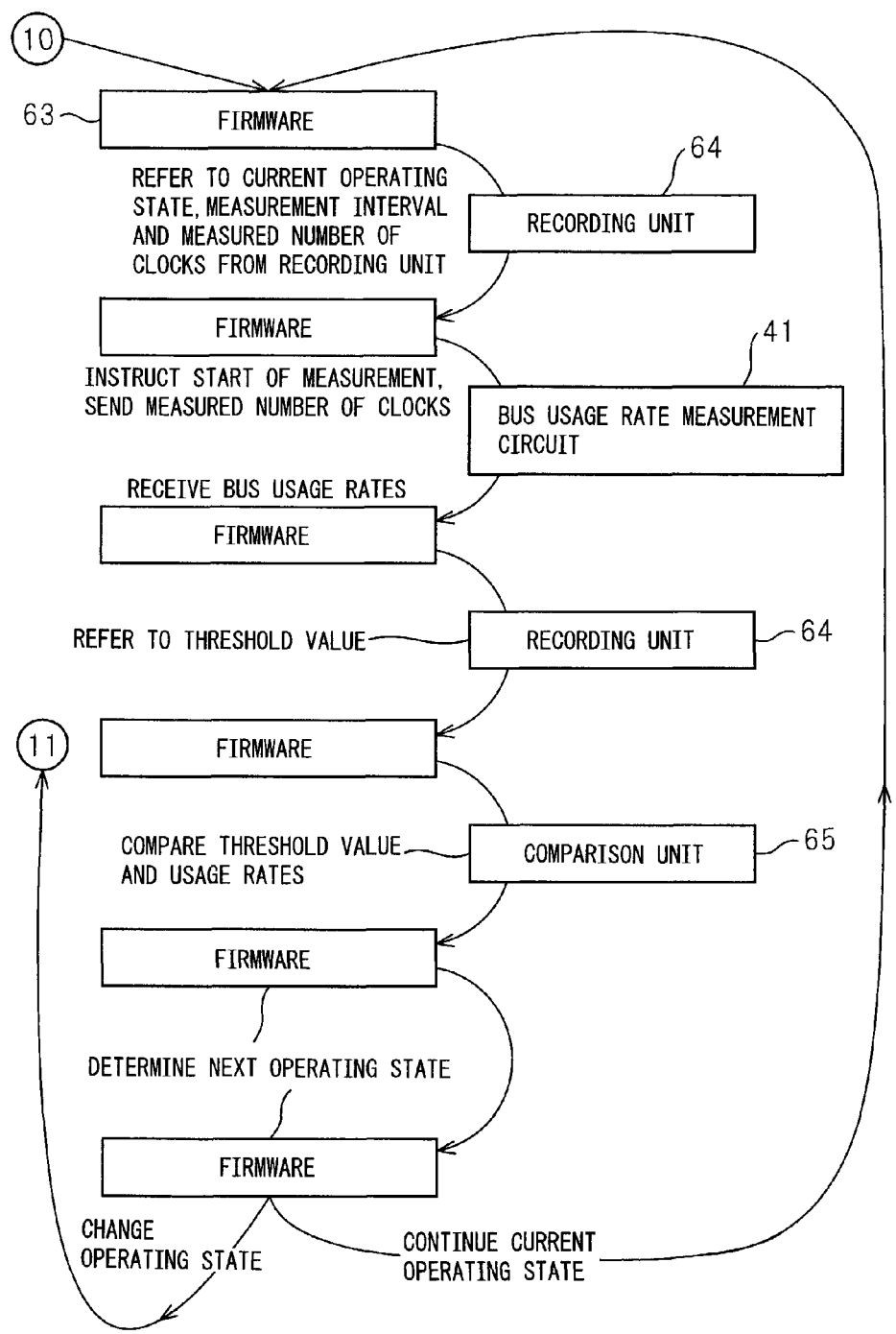
FIG. 21 is a state transition diagram (Part 2) seen from firmware 63.

In FIGS. 20 and 21, the firmware 63 in the system control unit 61 (FIG. 11) sends both the instruction for start of measurement and the measured number of clocks to the bus usage rate measurement circuits 41 with a measurement interval which is preset and held in the recording unit 64. In response to this, the measured values sent from the bus usage rate measurement circuits 41 and the threshold values "a" and "b" are compared by the comparison unit 65 (FIG. 11). Based on the results of comparison, the next operating state is determined.

When as a result of comparison, the firmware 63 judges that it continues the current operation, it waits for the elapse of the measurement interval set in the recording unit 64, then sends the bus usage rate measurement circuits 41 an instruction for start of measurement.

Further, when the firmware 63 decides to shift from the current operating state to another operating state, for example, when the firmware 63 decides to shift from ordinary operation to a bus retirement operation, it selects a bus to retire (set as not-in-service). As the method of selection of the not-in-service bus, the method may be considered of determining, in advance, one bus among the buses connected to the XBU0/1 (for example, the bus connected to the XBU1) and always selecting the bus connected to the XBU1 and setting it as not-in-service, when deciding to shift from an ordinary operation to a bus retirement operation.

Alternatively, there is the method of deciding, in advance, to select the bus of the XBU0 for the first shift from an ordinary operation to a bus retirement operation and selecting a bus (bus connected to XBU1), other than the bus (bus of XBU0) set not-in-service the previous time (first time), when deciding to shift from an ordinary operation to a bus retirement operation the second time, that is, alternately selecting the bus to be set not-in-service.

On the other hand, conversely to the above, when the firmware 63 decides to shift from a bus retirement operation to an ordinary operation, it recognizes the not-in-service bus so as to restore this not-in-service bus to operation. After that, the firmware 63 controls the bus control unit BC (FIG. 12), the clock supply unit 7, and other various units to end the shift. After the end, the firmware sends the bus usage rate measurement circuits 41 an instruction for start of measurement at the measurement interval set in the recording unit 64.

The measurement interval preset and held at the recording unit 64 may be defined by the following interval. That is, this is the time interval from when receiving a measured value sent from the bus usage rate measurement circuits 41 and determining the operating state to when sending the bus usage rate measurement circuits 41 the next measurement start instruction. Further, the threshold value "a" is a value at which a shift from ordinary operation to a bus retirement operation is possible, while the threshold value "b" is a value at which a shift from a bus retirement operation to ordinary operation is possible. These threshold values "a" and "b" are both preset and held in the recording unit 64 in the system control unit 61.

The measurement intervals and measured number of clocks held in the recording unit 64 and the threshold values "a" and "b" for shifting to the different states can be changed, in any way, by the user by using the input/output interface set in the SVP (FIG. 11). If the user inputs not the measured number of clocks, but the measurement time, this measurement time is converted to the measured number of clocks (measurement time (s)×bus operating frequency (Hz)), then this is held in the recording unit 64.

The relationship of the threshold values "a" and "b" is, usually, threshold value "a"<threshold value "b". In the following explanation of the operation, as an example, threshold value "a"=60%, threshold value "b"=80%, measurement interval=5 min, measured number of clocks=150×10⁹ (measurement time: 5 min), bus operating frequency=500 MHz. The "bus operating frequency" is the frequency of the buses connected to the XBUs. Note that the system control is all performed by the firmware 63.

In the following operation, a bus retirement operation is defined by a first bus retirement operation and second bus retirement operation. The first bus retirement operation is the operation for only stopping the supply of a clock to the not-in-service XBU, while the second bus retirement operation is the operation for stopping the supply of power to the not-in-service XBU. Note that during the second bus retirement operation, the supply of the clock may also be stopped.

First, the operating mode [I], that is, the operation at the time of shift from ordinary operation to the first or second bus retirement operation, will be explained. Further, the operating mode [II], that is, the operation at the time of first shifting from ordinary operation to the first bus retirement operation and, after continuing the operation of the first bus retirement operation for a certain time C, shifting to the second bus retirement operation, thus, performing the operation of the bus retirement operation with two stages, will be explained. Note that the "certain time C" will be explained in the operating mode [II].

Operating Mode [I]

Figure 22:
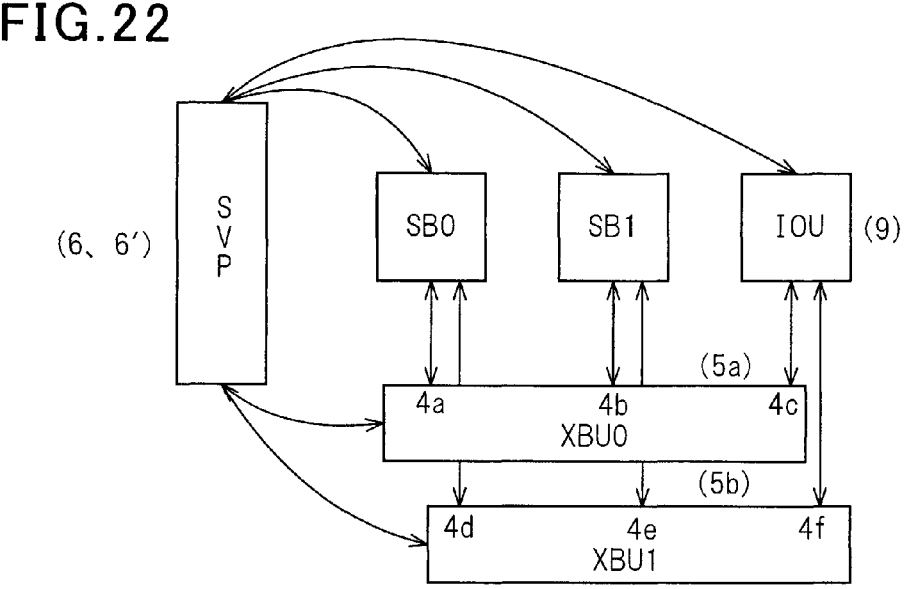
FIG. 22 is a view of a system configuration at the time of ordinary operation.

First, the operation from the ordinary operation to the first or second bus retirement operation will be explained. Here, FIG. 22 will be referred to. FIG. 22 is a view of the system configuration at the time of an ordinary operation. The two buses connected to the XBU0/1 are used for operation. During the ordinary operation, the system control unit 61 (FIG. 11) of the SVP sends instructions for start of measurement with the measured number of clocks 150×10⁹ to the packet input side and output side bus usage rate measurement circuits 41 which are set at the different points of 4*a* to 4*f*.

The bus usage rate measurement circuits 41 (FIG. 19), receiving the measured number of clocks and instructions for start of measurement, counts the number of valid sets passing through the "valid" counters for the measured number of clocks from the instruction for start of measurement, obtain the bus usage rates per unit clock after counting the measured number of clocks, then sends the same to the system control unit 61 (FIG. 11) of the SVP. The system control unit 61 of the SVP receives the measured usage rates from the input side and output side bus usage rate measurement circuits 41 of used buses (corresponding to 4*a* to 4*f*) and determines the operating states based on these received measured usage rates.

Table 1 shows the conditions for shifting from the ordinary operation to the first or second bus retirement operation.

TABLE 1

Conditions Shifting From Ordinary
Operation to First or Second Bus Retirement Operation (1) All of 4a + 4d, 4b + 4e, and 4c + 4f at inputs/outputs are threshold value "a" or less when total of bus usage rates of points corresponding to same SB and same IOU during operation is 60% (threshold "a") or less
(2) Average of bus usage rates of all corresponding points (4a to 4f) during operation is 30% (threshold "a"/2) or less When the condition of (1) or (2) of Table 1 is not satisfied, the system control unit 61 continues the ordinary operation, waits for the measurement interval (5 min), then sends the bus usage rate measurement circuits 41 an instruction for start of measurement with the measured number of clocks 150×10⁹.

On the other hand, when the condition of (1) or (2) of Table 1 is satisfied, the system control unit 61 of the SVP shifts to the first or second bus retirement operation by determining the bus to retire (set not-in-service) and instructing the bus control units BC of the SCs and I/O controller (FIG. 12) to disconnect the bus (in this example, the retired bus is the bus connected to the XBU1). Receiving this bus disconnect instruction, the bus control units BC of the SCs and the I/O controller (FIG. 12) set the bus connected to the XBU1 as not-in-service by controlling the packet division unit PD so as not to assign new packets to the XBU1, confirm that there are no packets at the buffer BF1 to the XBU1, then send a bus disconnect completion notification to the system control unit 61.

Figure 23:
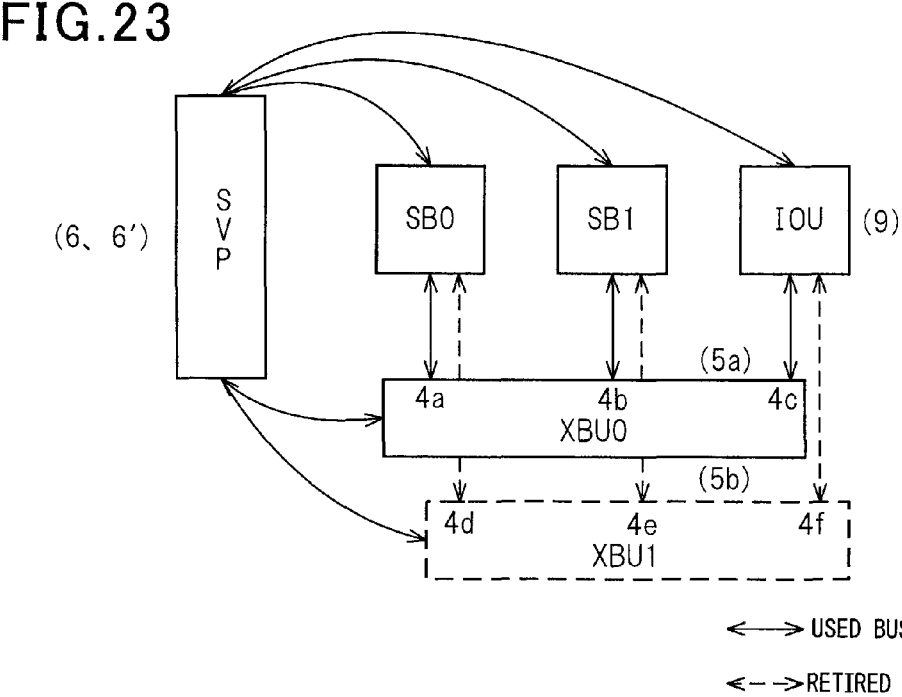
FIG. 23 is a view illustrating an example of a system configuration at the time of a bus retirement operation.
Figure 24:
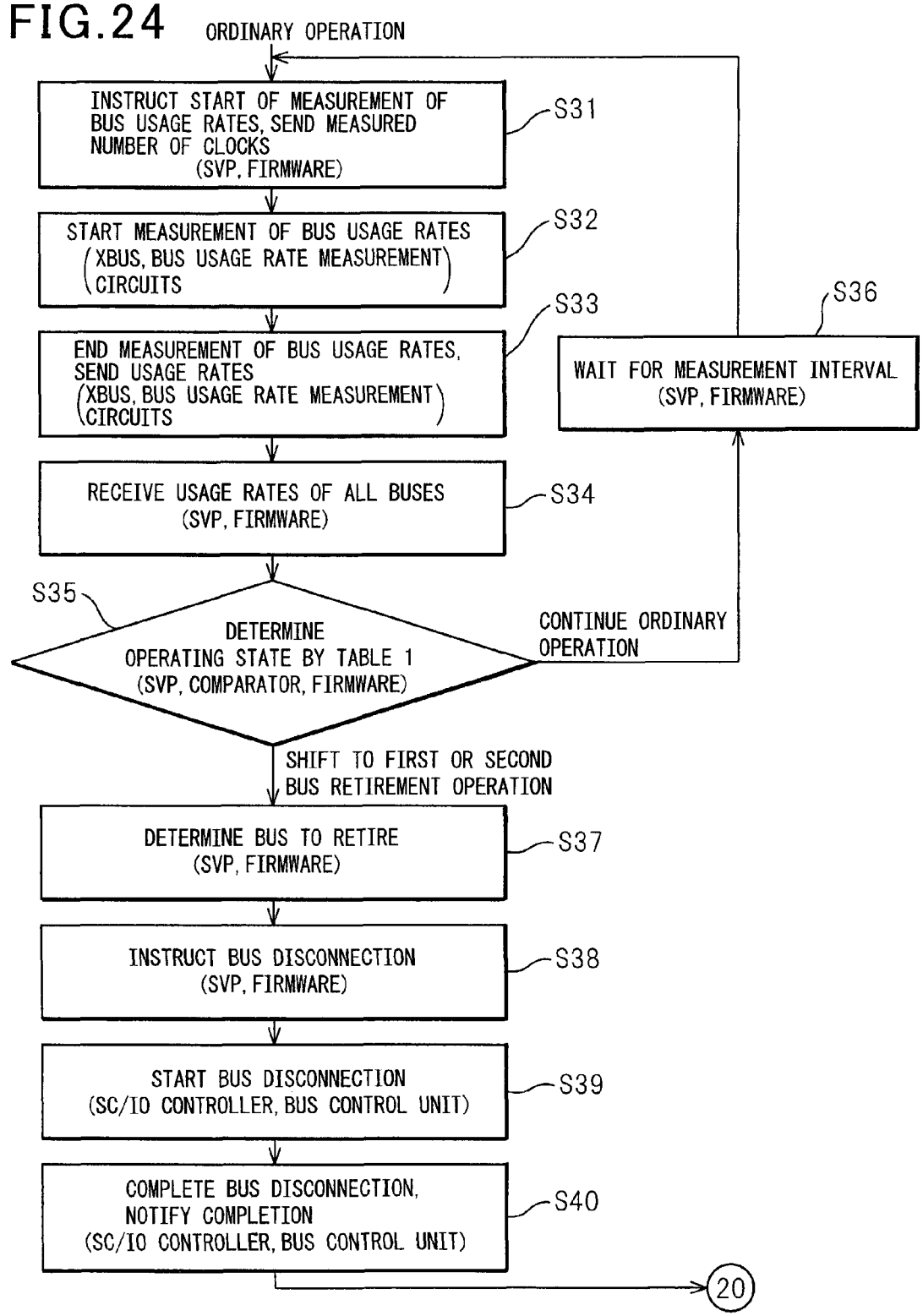
FIG. 24 is a flowchart (Part 1) illustrating the operation from ordinary operation to a first or second bus retirement operation.
Figure 25:
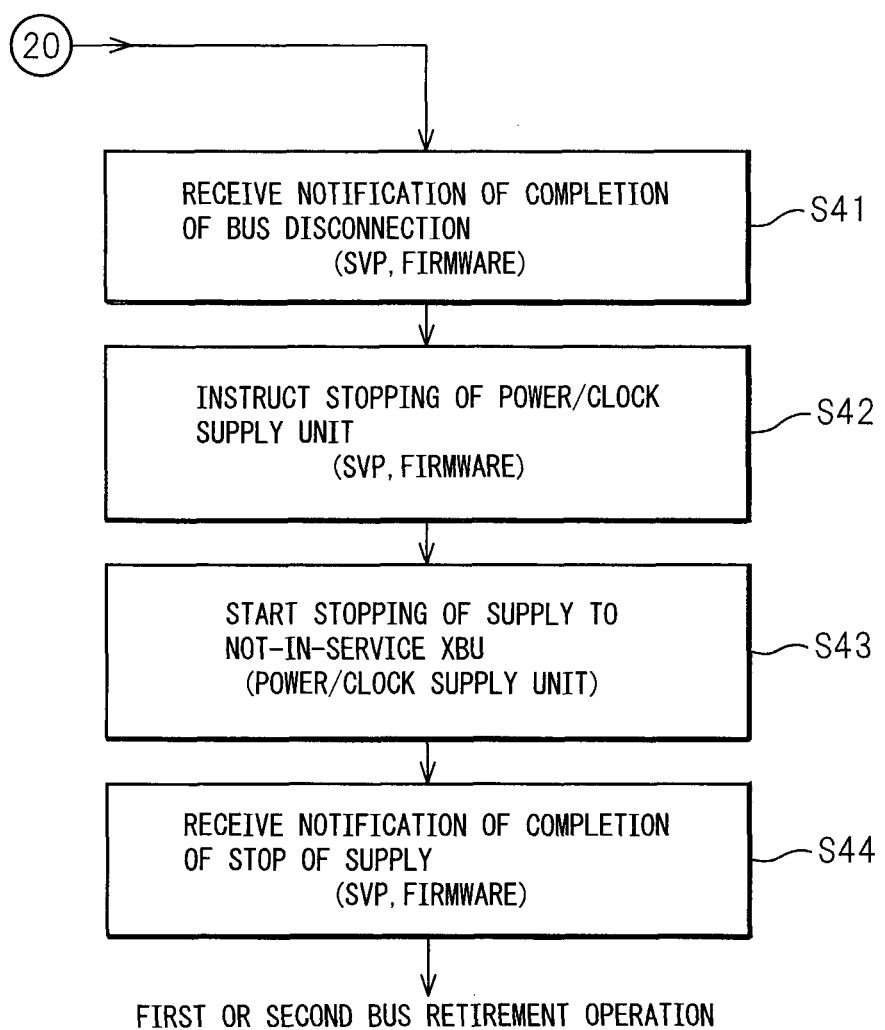
FIG. 25 is a flowchart (Part 2) illustrating the operation from ordinary operation to a first or second bus retirement operation.

The system control unit 61 of the SVP waits for bus disconnect completion notifications from all of the SCs and I/O controller and instructs the power supply unit 8 or clock supply unit 7 or both units 7 and 8 to stop the supply of power or a clock to the crossbar module (FIG. 18) of the XBU1. Receiving the stop instruction, the supply unit 7 stops the supply of the clock to the XBU1 and sends a stop completion notification to the system control unit 61. Receiving this, the system control unit 61 confirms the shift to the first or second bus retirement operation using only the XBU0. FIG. 23 is a view showing an example of the system configuration at the time of a bus retirement operation. The retired system is shown by broken lines. Note that, the flowchart from the ordinary operation to the first or second bus retirement operation is illustrated in FIGS. 24 and 25 explained later.

Next, the operation from the first or second bus retirement operation to ordinary operation will be explained. As explained above, FIG. 23 shows the time of the first or second bus retirement operation and shows the operating state when retiring the bus connected to the XBU1 (setting it to not-in-service).

During the first or second bus retirement operation, the system control unit 61 of the SVP instructs the data input side and output side bus usage rate measurement circuits 41 at the points of 4*a*, 4*b*, and 4*c* to start measurement with the measured number of clocks 150×10⁹.

The bus usage rate measurement circuits 41, receiving the measured number of clocks and instructions for start of measurement, count the number of valid sets passing through the "valid" counters for the measured number of clocks from the instruction for start of measurement, obtain the bus usage rates per unit clock after counting the measured number of clocks, then send the same to the system control unit 61 of the SVP.

The system control unit 61 receives the usage rates from the data input side and output side bus usage rate measurement circuits 41 of all of the used buses (corresponding to 4a, 4b, and 4c) and determines the operating state based on this.

Table 2 shows the conditions for shifting from the first or second bus retirement operation to ordinary operation.

TABLE 2

Conditions Shifting From First or
Second Bus Retirement Operation to Ordinary Operation (1) Any of 4a, 4b, and 4c is 80% (threshold "b") or more at inputs/outputs when bus usage rate of any corresponding point during operation is 80% (threshold "b") or more
(2) Average of bus usage rates of all corresponding points (4a, 4b, 4c) during operation is 80% (threshold "b") or more When the condition of (1) or (2) of the Table 2 is not satisfied, the system control unit 61 continues the first or second bus retirement operation, waits for the measurement interval (5 min), then sends the bus usage rate measurement circuits 41 an instruction for start of measurement at the measured number of clocks $150 \times 10^9$ (measurement time: 5 min).

On the other hand, when the condition of (1) or (2) of Table 2 is satisfied, the system control unit 61 of the SVP decides to shift to ordinary operation. The method of shifting to ordinary operation differs depending on if the operating state before deciding on the shift was the first bus retirement operation or was the second bus retirement operation.

First, the case of shifting from the first bus retirement operation to ordinary operation will be explained. The system control unit 61, determining the shift from the first bus retirement operation to the ordinary operation, instructs the clock supply unit 7 to resume the supply of the clock. The clock supply unit 7 receives that supply instruction, supplies the clock to the not-in-service XBU1, and sends notification of the completion of supply to the system control unit 61.

The system control unit 61 receives from the clock supply unit 7 the notification of completion of supply and instructs the bus control units BC of the SCs and I/O controller (FIG. 12) to instruct activation of the bus. Receiving this instruction, the bus control units BC of the SCs and I/O controller activate the bus connected to the previously not-in-service XBU1 to the operating system by controlling the packet division unit PD (FIG. 12). The bus control unit BC confirms that the activation has been completed, then sends the system control unit 61 a notification of completion of activation. The system control unit 61, receives from the bus control unit BC the activation completion notification and confirms the shift to ordinary operation (FIG. 22).

Next, the case of the shift from the second bus retirement operation to ordinary operation will be explained. The case of also stopping the supply of clock in addition to stopping power to the XBU1 at the time of second bus retirement operation will be explained.

The system control unit 61, determining the shift from the second bus retirement operation to ordinary operation, instructs the power and clock supply units (7, 8) to supply power and the clock. The power and clock supply units (7, 8) receive the supply instructions, supply the power and clock to the previously not-in-service XBU1, and send a notification of supply completion to the system control unit 61. The system control unit 61 receives supply completion notifications from the power and clock supply unit and instructs the not-in-service XBU1 to start the preparations for operation. Receiving the instruction for the start of preparation of the operation, the crossbar module of the XBU1 (FIG. 18) confirms the stability of the power being supplied to the crossbar module, then initializes the crossbar module and sends a notice of completion of preparations for operation to the system control unit 61. The system control unit 61 receives the notification of completion of the preparations for operation from the XBU1 and instructs the bus control units BC of the SCs and I/O controller (FIG. 12) to activate the bus.

The bus control units BC of the SCs and I/O controller receive that bus activation instruction and activate the bus connected to the previously not-in-service XBU1 by control of the packet division unit PD (FIG. 12). The bus control units BC confirms the completion of activation, then sends a notification of activation to the system control unit 61. The system control unit 61 receives the activation completion notification from the bus control unit and recognizes the shift to the original ordinary operation (FIG. 22). Note that, a flowchart from the first or second bus retirement operation to ordinary operation will be illustrated in the later mentioned FIGS. 26, 27, and 28.

Operating Mode [II]

Next, the case of shifting from ordinary operation to the first bus retirement operation stopping only the supply of the clock and, when in the first bus retirement operating state for a certain time C, shifting to the second bus retirement operation also stopping the supply of power to the not-in-service XBU will be explained.

The time C is the time after the shift to the first retirement operation from the ordinary operation, which enables the shift to the second retirement operation after the shift to the first retirement operation. Further, the condition for shifting from the first bus retirement operation to the second bus retirement operation is that the operation has not been shifted to the ordinary operation during the time C. Note that in the present operating mode [II], the time C is made 30 min. The time C can also be set and held, in advance, in the recording unit 64 in the SVP (FIG. 11), where the time C is changeable by the user ("change in setting" of FIG. 11).

Further, referring to FIG. 22, this figure illustrates the time of ordinary operation by using both of the two buses connected to the XBU0/1. During ordinary operation, the system control unit 61 of the SVP instructs the data input side and output side bus usage rate measurement circuits 41, at the points 4a to 4f, to start the measurement with the measured number of clocks $150 \times 10^9$.

Receiving the measured number of clocks and instruction for start of measurement, the bus usage rate measurement circuit 41 (FIG. 19) counts the number of valid sets passing through the "valid" counters during the measured number of clocks from the instruction for start of measurement, counts the measured number of clocks, obtains the bus usage rates per unit clock, and sends it to the system control unit 61 of the SVP. The control unit 61 receives the usage rates from the data input side and output side bus usage rate measurement circuits 41 of all of the buses (corresponding to 4a to 4f) and decides on the operating states based on these.

Referring to the above Table 1 illustrating the conditions for shift from ordinary operation to the first bus retirement operation, when the condition of (1) or (2) of Table 1 is not satisfied, the system control unit 61 continues the ordinary operation, waits for the measurement interval (5 min), then sends the bus usage rate measurement circuits 41 an instruction for start of measurement with the measured number of clocks $150 \times 10^9$.

On the other hand, when the condition of (1) or (2) of Table 1 is satisfied, the system control unit 61 of the SVP shifts to the first bus retirement operation by determining the bus to retire (set not-in-service) and instructing the bus control units BC of the SCs and I/O controller (FIG. 12) to disconnect the bus connected to the XBU1 (in this example, the retired bus is the bus connected to the XBU1). Receiving the bus disconnect instruction, the bus control unit BC of the SC and the I/O controller (FIG. 12) set the bus connected to the XBU1 as not-in-service by controlling the packet division unit PD so as not to allocate new packets to the XBU1, confirm that there are no packets, at the buffer BF1, to the XBU1 (FIG. 12), then send a bus disconnect completion notification to the system control unit 61.

Receiving this, the system control unit 61 of the SVP waits for a bus disconnect completion notification from all of the SCs and I/O controller and instructs the clock supply unit 7 to stop the supply of a clock to the crossbar module (FIG. 18) of the XBU1. Receiving this stop instruction, the clock supply unit 7 stops the supply of the clock to the XBU1 and sends a stop completion notification to the system control unit 61. Receiving this, the system control unit 61 confirms the shift to the first bus retirement operation using only the XBU0.

The system control unit 61 confirms the shift to the first bus retirement operation, then waits for the measurement interval (5 min), then instructs the data input side and output side bus usage rate measurement circuits 41, at the points 4a, 4b, and 4c, with the measured number of clocks $150 \times 10^9$ to start measurement. The bus usage rate measurement circuits 41, receiving the measured number of clocks and instruction for start of measurement count the number of valid, counts the valid sets passing through the "valid" counters for the measured number of clocks from the measurement start instruction. After counting the measured number of clocks, the bus usage rate measurement circuits 41 obtain the bus usage rates per unit clock and send the same to the system control unit 61 of the SVP.

Receiving this, the system control unit 61 receives the usage rates from the data input side and output side bus usage rate measurement circuits 41 of all of the buses used (corresponding to 4a, 4b, and 4c) and determines the operating states based on this.

Referring to Table 2 illustrating the conditions for shifting from the first bus retirement operation to ordinary operation, when the condition of (1) or (2) of Table 2 is not satisfied, the system control unit 61 confirms if the time C (30 min) has elapsed from the start of the first bus retirement operation. When the time C has not elapsed, the unit 61 waits for the measurement interval (5 min), then instructs the bus usage rate measurement circuits 41 to start measurement with the measured number of clocks $150 \times 10^9$.

When the time C (30 min) has already passed from the start of the first bus retirement operation, the system control unit 61 shifts to the second bus retirement operation by instructing the power supply unit 8 to stop the supply of power to the previously not-in-service XBU1. Receiving the stop instruction, the power supply unit 8 stops the supply of power to the XBU1 and sends a notification of stop completion to the system control unit 61. The system control unit 61 confirms the shift to the second bus retirement operation by the stop completion notification from the power supply unit 8.

On the other hand, when the condition of (1) or (2) of Table 2 is satisfied, the system control unit 61 decides to shift from the first bus retirement operation to ordinary operation. Further, the system control unit 61 instructs the clock supply unit 7 to supply a clock to the XBU1. The clock supply unit 7 receives that supply instruction, supplies a clock to the previously not-in-service XBU1, and sends a notification of supply completion to the system control unit 61. The system control unit 61 receives the supply completion notification from the clock supply unit 7 and instructs the bus control units BC of the SCs and I/O controller (FIG. 12) to activate the bus at the XBU1.

The bus control units BC of the SCs and I/O controller receive the bus activation instruction and activate the bus connected to the previously not-in-service XBU1 by controlling the packet division unit PD (FIG. 12) to activate it. The bus control units BC send notifications of activation completion to the system control unit 61 by the completion of activation. The system control unit 61 informs that ordinary operation (FIG. 2) has been shifted to by the activation completion notification from the bus control units BC.

After the shift to the second bus retirement operation, the system control unit 61 waits for the measurement interval (5 min), then instructs the data input side and output side bus usage rate measurement circuits 41, at the points 4a, 4b, and 4c, to start measurement with the measured number of clocks $150 \times 10^9$.

The bus usage rate measurement circuit 41, receiving that measured number of clocks and instruction for start of measurement, counts the number of valid sets passing through the "valid" counter for the measured number of clocks from the measurement start instruction. After counting the measured number of clocks, the bus usage rate measurement circuit 41 obtains the bus usage rates per unit clock and sends the same to the system control unit 61 of the SVP. The system control unit 61 receives the usage rates from the data input side and output side bus usage rate measurement circuits 41 at all of the used buses (corresponding to 4a, 4b, and 4c) and determines the operating state based on these. At this time, the system control unit 61 determines whether to shift to ordinary operation from the second bus retirement operation based on Table 2.

When the condition of (1) or (2) of Table 2 is not satisfied, the system control unit 61 continues the second bus retirement operation, waits for the measurement interval (5 min), then sends the bus usage rate measurement circuits 41 an instruction for start of measurement with the measured number of clocks $150 \times 10^9$.

On the other hand, when the condition of (1) or (2) of Table 2 is satisfied, the system control unit 61 of the SVP shifts to ordinary operation and instructs the power and clock supply units (7, 8) to supply the XBU1 the power and clock.

The power and clock supply units (7, 8) receive the supply instruction, supply the previously not-in-service XBU1 the power and clock, and send a notification of completion of supply to the system control unit 61. The system control unit 61 receives the supply completion notification from the power and clock supply units and instructs the previously not-in-service XBU1 to start preparations for operation. Receiving the instruction for the start of preparations for operation, the crossbar module of the XBU1 (FIG. 18) confirms the stability of the voltage being fed to the crossbar module, initializes the crossbar module, and sends the system control unit 61 a notification of completion of preparations for operation. The system control unit 61 receives the notification of completion of preparation of operations and instructs the bus control units BC of the SCs and I/O controller (FIG. 12) to activate the bus of the XBU1. The bus control units BC of the SCs and I/O controller receive the bus activation instructions and activate the bus connected to the previously not-in-service XBU1 by activation control of the packet division unit PD (FIG. 12). The bus control units BC send the system control unit 61 notifications of activation completion by the completion of bus activation. The system control unit 61 confirms the shift to ordinary operation (FIG. 22) by the activation completion notifications from the bus control units BC. Note that, the series of operations at the operating mode [II] are illustrated by the flowchart of the later explained FIGS. 29, 30, 31, and 32.

FIG. 24 is a flowchart (Part 1) illustrating the process from ordinary operation to the first or second bus retirement operation, while FIG. 25 is the same flowchart (Part 2).

The process instructs the start of measurement of the bus usage rates and sends the measured number of clocks (S31), starts measurement of the bus usage rates (S32), and ends the measurement of the bus usage rates and sends the usage rates (S33).

When receiving the usage rates of all buses (S34), the process determines the operating state by Table 1 (S35) and, if "continue ordinary operation", waits for the measurement interval (S36).

If "shift to first or second bus retirement operation", the process determines the bus to retire (S37).

The process instructs disconnection of the bus (S38), starts disconnection of the bus (S39), and completes the disconnection of the bus and sends a notification of completion (S40).

When receiving the notification of completion of bus disconnection (S41), the process instructs the power and clock supply units to stop the supply of power and clock to the not-in-service XBU (S42), and the power and clock supply units starts stopping the supply of power and clock to the not-in-service XBU and sends a notification of stop completion (S43).

When receiving a notification of completion of stopping the supply (S44), the process starts the first or second bus retirement operation.

Figure 26:
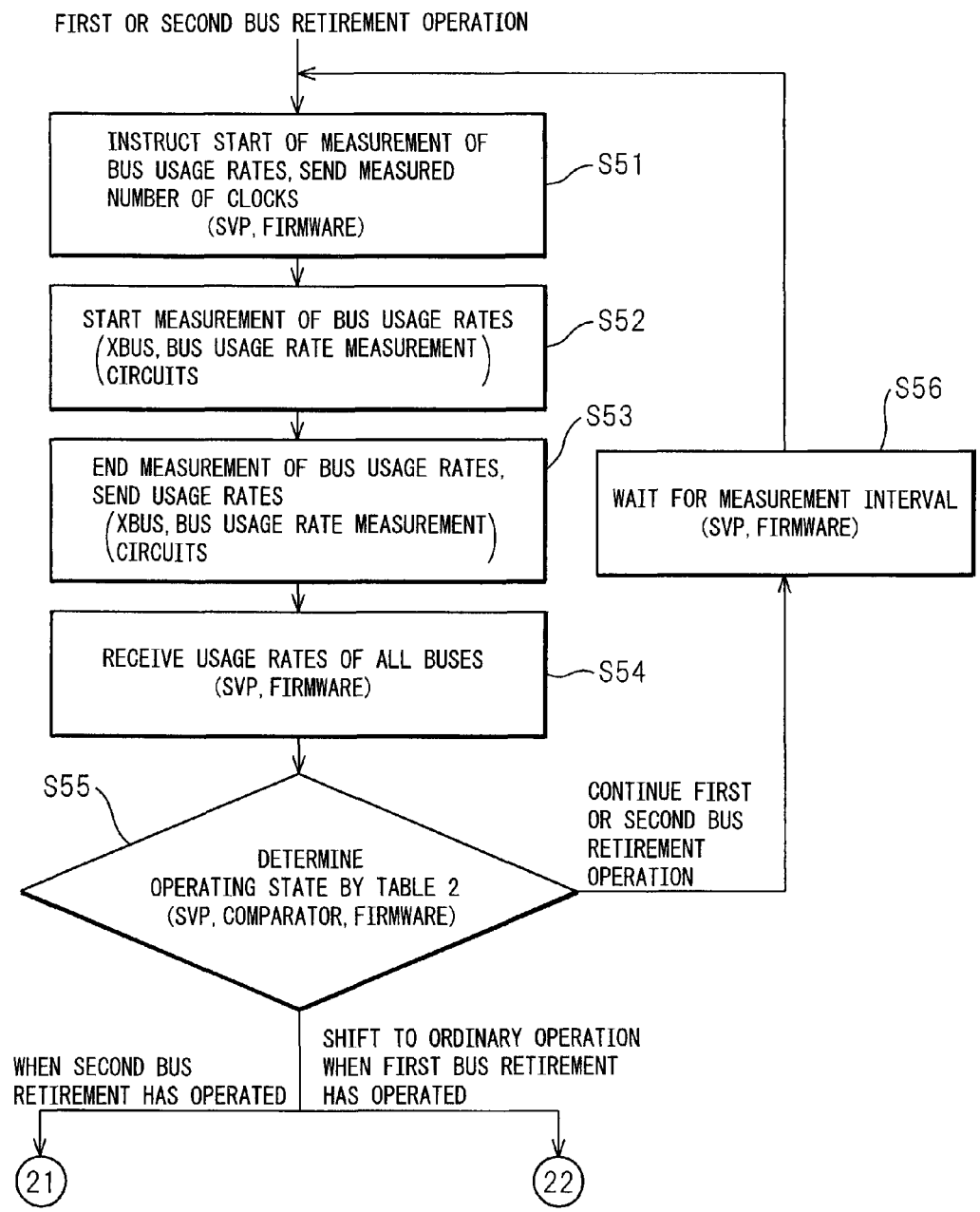
FIG. 26 is a flowchart (Part 1) illustrating the operation from a first or second bus retirement operation to ordinary operation.
Figure 27:
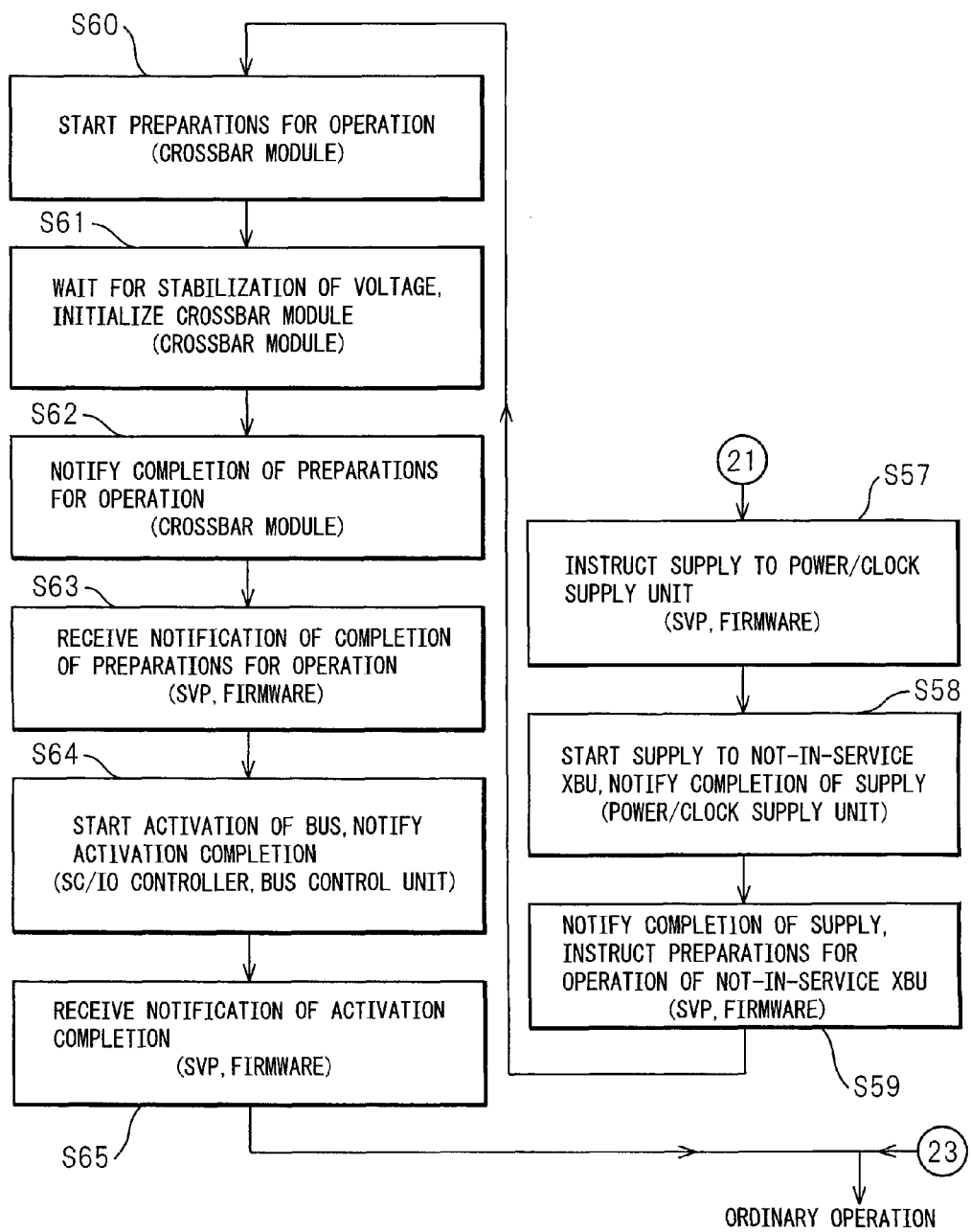
FIG. 27 is a flowchart (Part 2) illustrating the operation from a first or second bus retirement operation to ordinary operation.
Figure 28:
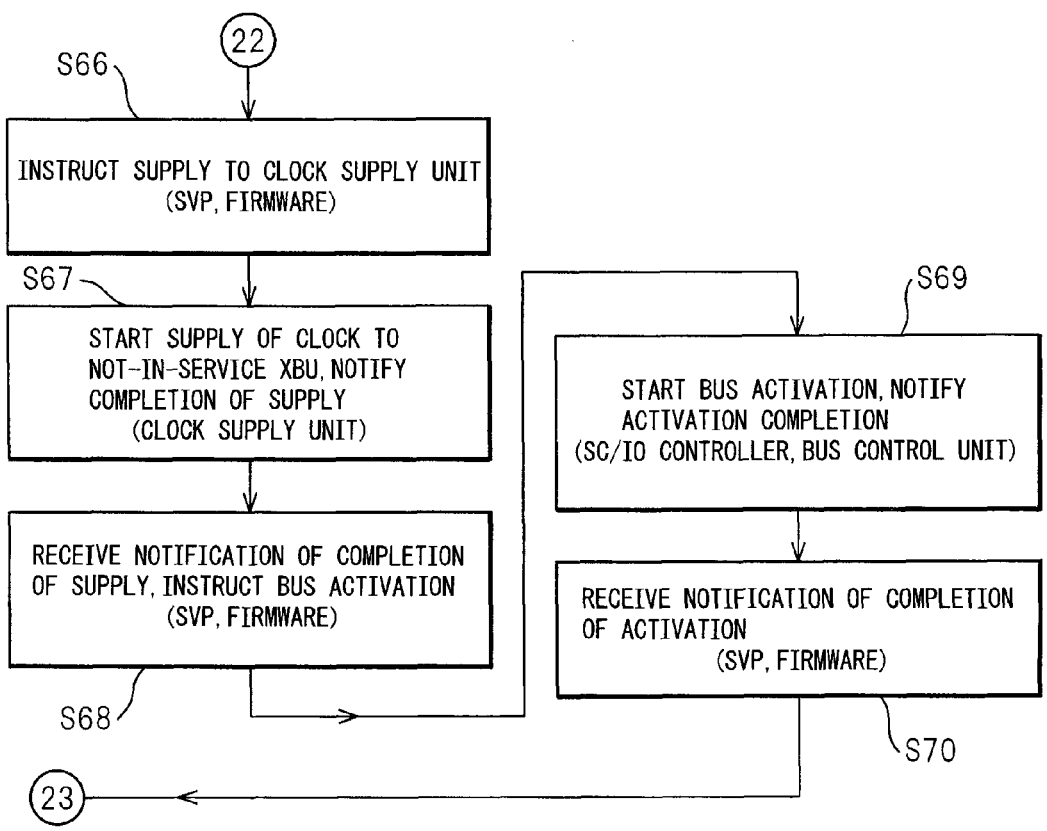
FIG. 28 is a flowchart (Part 3) illustrating the operation from a first or second bus retirement operation to ordinary operation.

FIG. 26 is a flowchart (Part 1) illustrating the operation from the first or second bus retirement operation to ordinary operation, FIG. 27 is the same flowchart (Part 2), and FIG. 28 is the same flowchart (Part 3).

The process instructs the start of measurement of the bus usage rates and sends the measured number of clocks (S51), starts measurement of the bus usage rates (S52), and ends the measurement of the bus usage rates and sends the usage rates (S53).

When receiving the usage rates of all buses (S54), the process determines the operating state by Table 2 (S55) and, if "continue first or second bus retirement operation", waits for the measurement interval (S56).

At S55, when "shift to ordinary operation" and having performed the second bus retirement operation, the process instructs the power and clock supply units to supply the power and clock (S57) and starts the supply to the not-in-service XBU and notifies the completion of supply (S58).

When there is a notification of completion of supply, the process instructs the start of preparations of operation of the not-in-service XBU (S59) and starts the preparations of operation (S60).

Then, the process waits for stabilization of the voltage, initializes the crossbar module (S61), and notifies the completion of preparations of operation (S62).

When receiving a notification of completion of preparations of operation (S63), the process starts the bus activation, then notifies the activation completion (S64).

When receiving a notification of activation completion (S65), it enters ordinary operation.

At the above S55, when "shift to ordinary operation" and having performed the first bus retirement operation, the process instructs the clock supply unit to supply the clock (S66) and starts the supply of the clock to the not-in-service XBU and notifies the completion of supply (S67).

When receiving the supply completion notification, the process instructs bus activation (S68), starts that bus activation, and notifies activation completion (S69).

When receiving a notification of activation completion (S70), the process enters ordinary operation.

Figure 29:
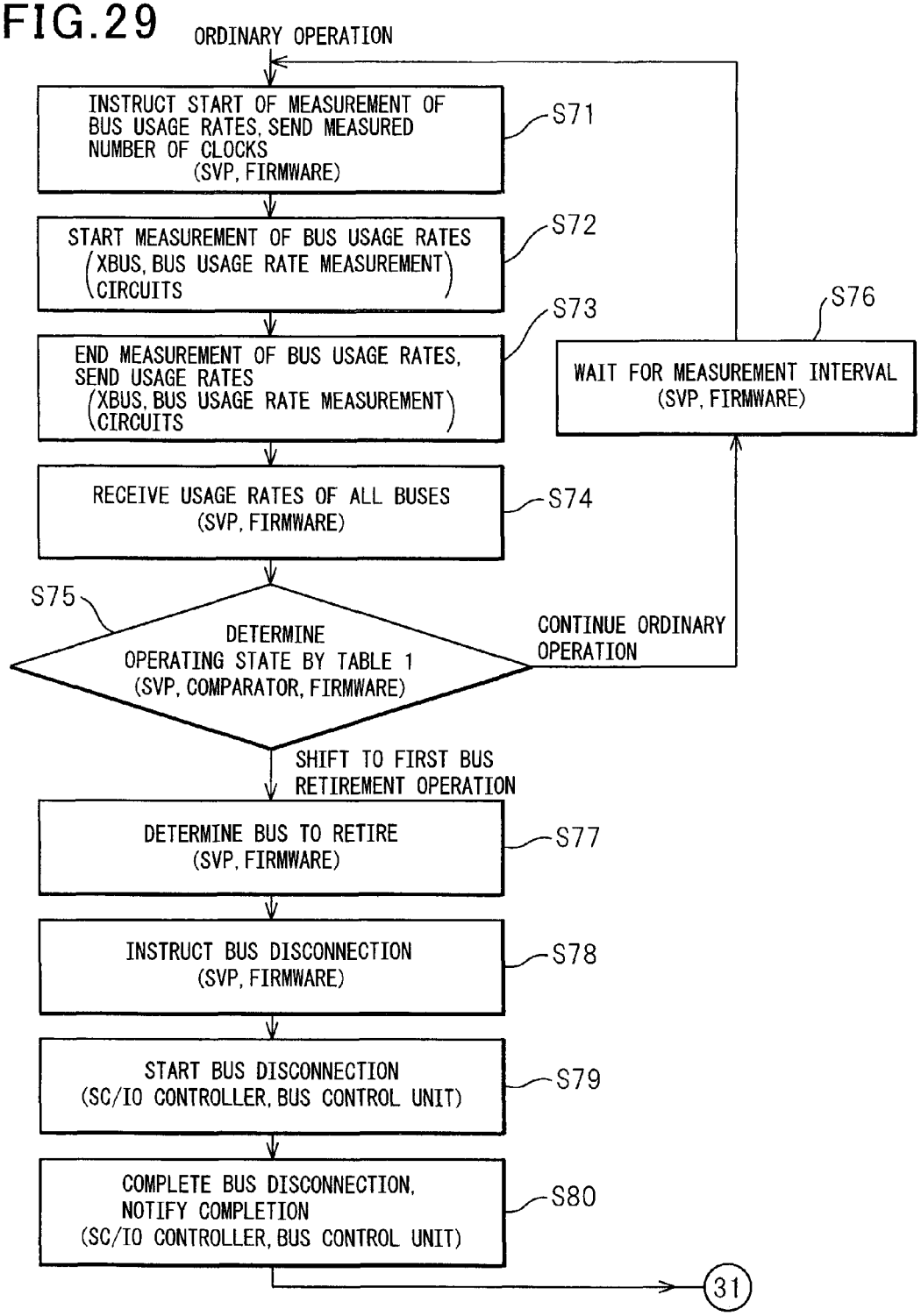
FIG. 29 is a flow chart (Part 1) illustrating a series of operations at an operating mode [II]
Figure 30:
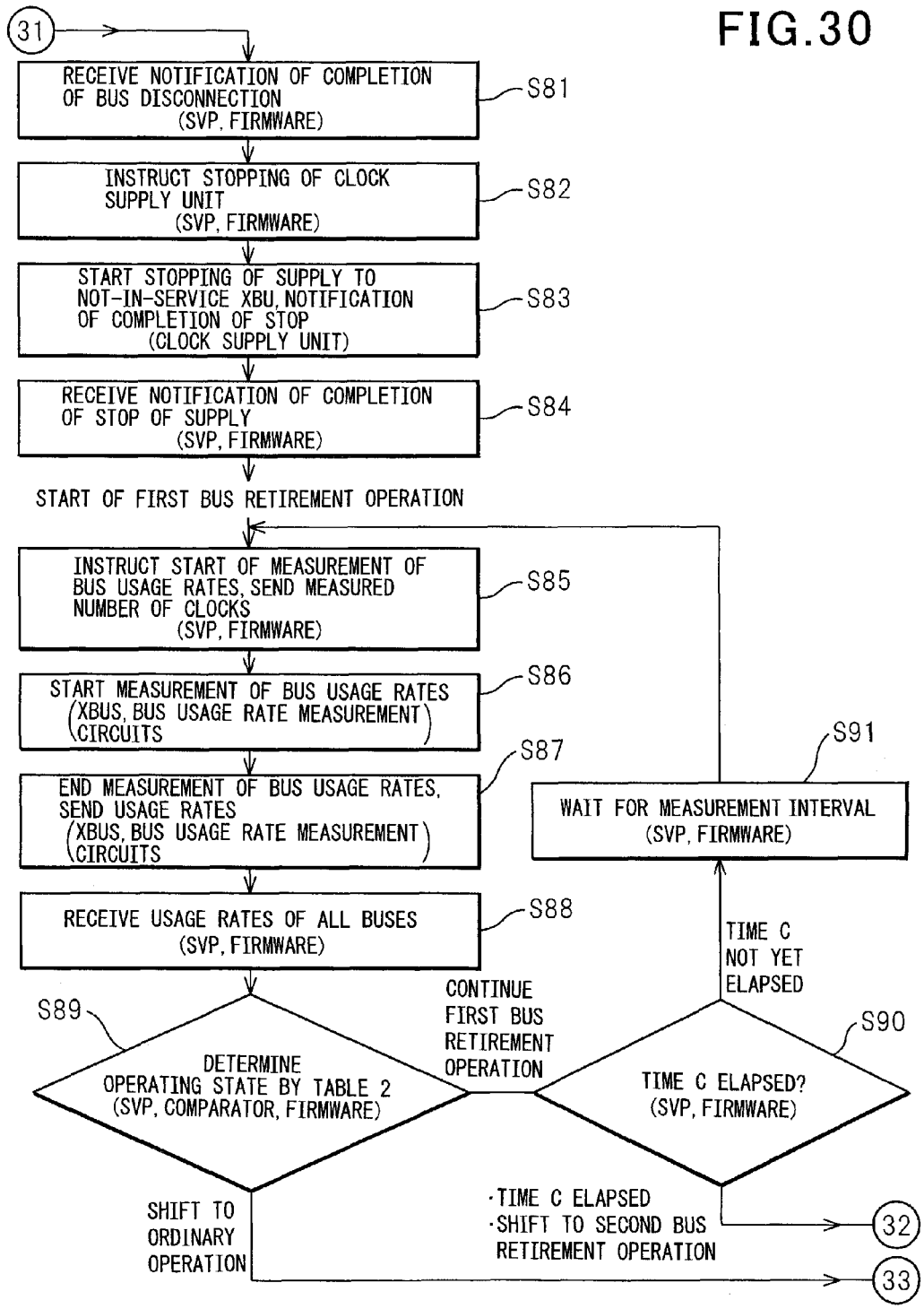
FIG. 30 is a flow chart (Part 2) illustrating a series of operations at an operating mode [II]
Figure 31:
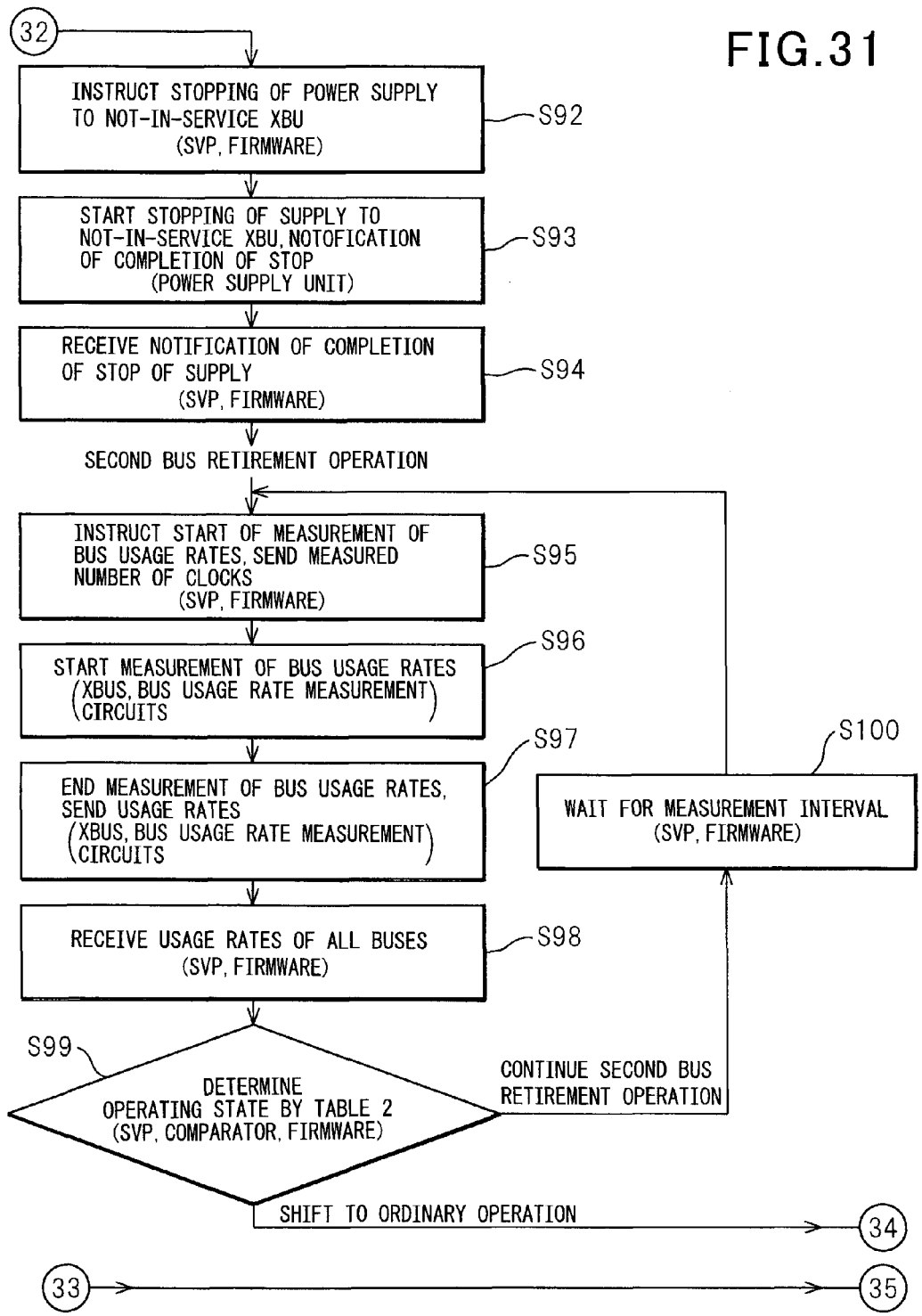
FIG. 31 is a flow chart (Part 3) illustrating a series of operations at an operating mode [II]
Figure 32:
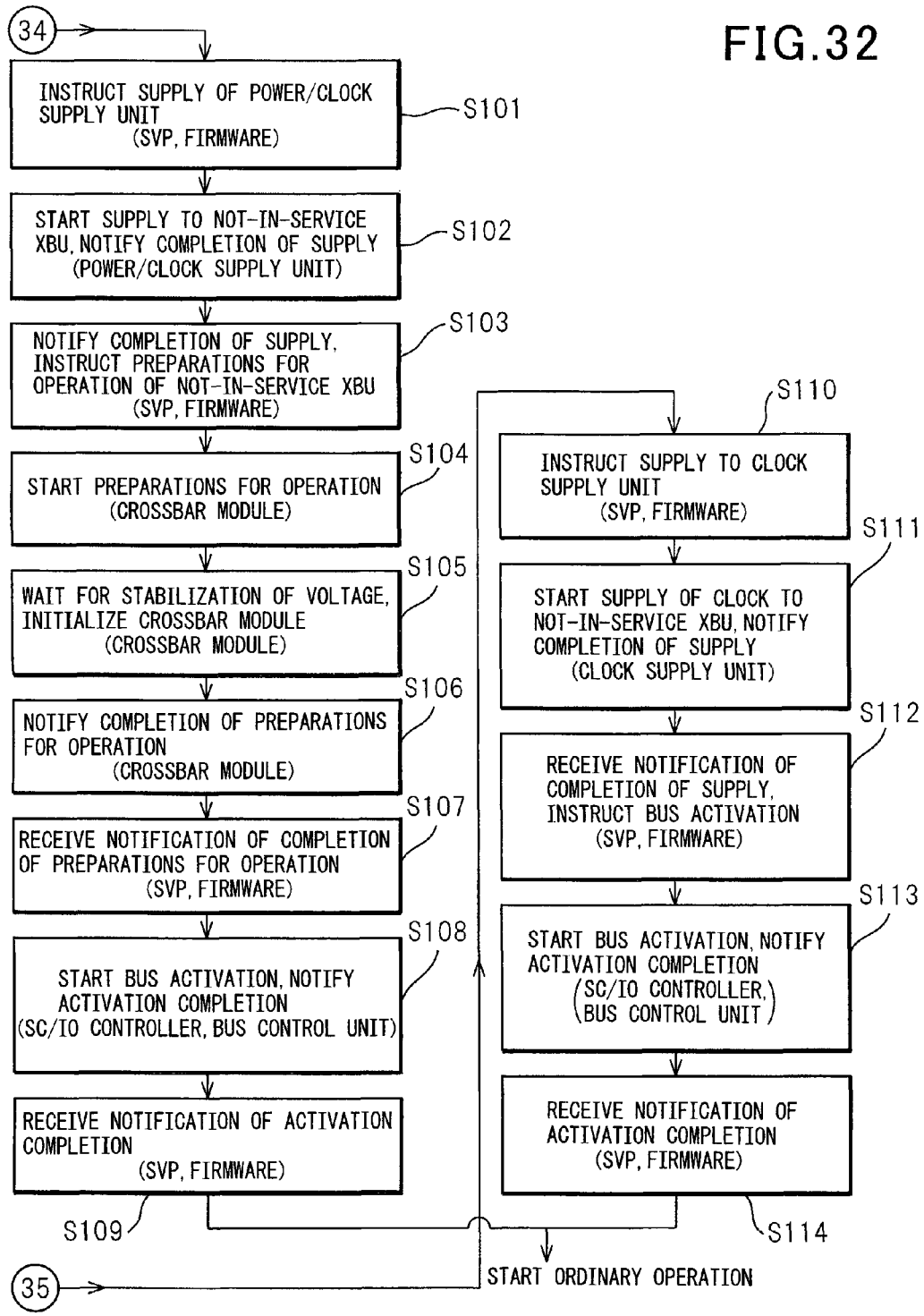
FIG. 32 is a flow chart (Part 4) illustrating a series of operations at an operating mode [II].

FIG. 29 is a flow chart (Part 1) illustrating the series of operations at the operating mode [II], FIG. 30 is the same flowchart (Part 2), FIG. 31 is the same flowchart (Part 3), and FIG. 32 is the same flowchart (Part 4).

The process instructs the start of measurement of the bus usage rates, sends the measured number of clocks (S71), and starts measurement of the bus usage rates (S72).

When the measurement of the bus usage rates ends, the process sends the usage rates (S73).

When receiving the usage rates of all buses (S74), the process determines the operating state by Table 1 (S75). If "continue ordinary operation", the process waits for the measurement interval (S76).

At S75, if "shift to first retirement operation", the process determines the bus to retire (S77).

Further, the process instructs the disconnection of the bus (S78) and starts the disconnection of the bus (S79).

When the bus disconnection is completed, the process notifies that completion (S80).

When receiving a notification of completion of bus disconnection (S81), the process instructs the clock supply unit to stop the supply (S82) and starts the stop of supply to the not-in-service XBU and notifies the stop completion (S83).

When receiving a notification of completion of stop of supply (S84), the process starts the first bus retirement operation.

When the process instructs the start of measurement of the bus usage rates and simultaneously sends the measured number of clocks (S85), the process starts the measurement of the bus usage rates (S86).

When the measurement of the bus usage rates ends, the process sends the usage rates (S87).

When receiving the usage rates of all buses (S88), the process determines the operating state by Table 2 (S89).

At S89, when "continue first bus retirement operation", the process judges if the time C has elapsed (S90). If it has not elapsed, it waits of the measurement interval until the next measurement (S91).

When elapsed, the process shifts to the "second bus retirement operation".

The process instructs the power supply unit to stop the supply of power to the not-in-service XBU (S92), starts the stop of power supply to that not-in-service XBU, then notifies the stop completion (S93).

When receiving that notification of completion of the stop of the supply (S94), the process starts the second bus retirement operation.

When again instructing the start of measurement of the bus usage rates and sending the measured number of clocks (S95), the process starts measurement of the bus usage rates (S96).

When the measurement of the bus usage rates ends, the process sends the usage rates (S97).

When receiving the usage rates of all buses (S98), the process determines the operating state by Table 2 (S99).

At S99, if "continue second bus retirement operation", the process waits for the measurement interval until the next measurement (S100).

At S99, if "shift to ordinary operation", the process instructs the power and clock supply units to start the supply (S101) and starts the supply to the not-in-service XBU. Further, it notifies the completion of the supply (S102).

If receiving notification of the completion of supply, the process instructs the start of preparations of operation of the not-in-service XBU (S103) and starts the preparations for operation (S104).

The process waits for stabilization of the voltage at the crossbar module and initializes the crossbar module (S105), then notifies the completion of the preparations for operation (S106).

When receiving notification of completion of preparations for operation (S107), the process starts the bus activation, then notifies activation completion (S108).

When receiving notification of the activation completion (S109), the process starts ordinary operation.

At the above S89, when it is decided to "shift to ordinary operation", the process instructs the clock supply unit to supply the clock (S110), starts the supply of the clock to the not-in-service XBU, then notifies the completion of the supply (S111).

When receiving the notification of supply completion, the process instructs bus activation (S112) and starts the bus activation. After that, it notifies the activation completion (S113).

When receiving that activation completion notification (S114), the process starts ordinary operation.

Note that, the firmware disclosed in the specification may also be defined as the operating program at the data transfer circuits 5a, 5b illustrated in FIG. 4. The program may be as follows.

That is, there may be provided an operating program of the first data transfer circuit 5a or the second data transfer circuit 5b in an information processing apparatus which makes a computer realize:

a first function of performing, for the first route <1>, first counting processing that counts the first data transfer amount D1 for the first control circuit 3a, second counting processing that counts the second data transfer amount D2 for the second control circuit 3b, and third counting processing that counts the third data transfer amount D3 for the input/output control unit 9, a second function of performing, for the second route <2>, fourth counting processing that counts the fourth data transfer amount D4 for the first control circuit 3a, fifth counting processing that counts the fifth data transfer amount D5 for the second control circuit 3b, and sixth counting processing that counts the sixth data transfer amount D6 for the input/output control unit 9, a third function of performing first addition processing that finds the first total value S1 of the first data transfer amount D1 and fourth data transfer amount D4, second addition processing that finds the second total value S2 of the second data transfer amount D2 and fifth data transfer amount D5, and third addition processing that finds the third total value S3 of the third data transfer amount D3 and sixth data transfer amount D6, a fourth function of comparing the first, second, and third total values S1, S2, and S3 with a predetermined threshold value TH, and a fifth function of making the first data transfer circuit 5a retire the first route <1> or making the second data transfer circuit 5b retire the second route <2>, when any or the total value of all of the first, second, and third total values is smaller than the predetermined threshold value TH.

In another embodiment, there may be provided an operating program of the first data transfer circuit 5a or the second data transfer circuit 5b in an information processing apparatus which makes a computer realize:

a first function of performing, for the first route <1>, first counting processing that counts the first data transfer amount D1 for the first control circuit 3a, second counting processing that counts the second data transfer amount D2 for the second control circuit 3b, and third counting processing that counts the third data transfer amount D3 for the input/output control unit 9, a second function of performing, for the second route <2>, fourth counting processing that counts the fourth data transfer amount D4 for the first control circuit 3a, fifth counting processing that counts the fifth data transfer amount D5 for the second control circuit 3b, and sixth counting processing that counts the sixth data transfer amount D6 for the input/output control unit 9, a third function of finding the average value of the first, second, third, fourth, fifth, and sixth data transfer amounts D1 to D6, a fourth function of comparing the average value and the predetermined threshold value, and a fifth function of making the first data transfer circuit 5a retire the first route <1> or making the second data transfer circuit 5b retire the second route <2> when the average value AV is smaller than the predetermined threshold value TH.

As explained above, when a bus usage rate is low during system operation, it is possible to shift from ordinary operation to a bus retirement operation to "dynamically" turn a crossbar unit (data transfer circuit) off. For this reason, it is possible to dynamically turn a crossbar unit on when the load increases. Therefore, it is possible to reduce the power consumption with finer control.

What is claimed is:

1. An information processing apparatus comprising:
a first control circuit connected to a first processing circuit and first storage circuit,
a second control circuit connected to a second processing circuit and second storage circuit,
a first data transfer circuit transferring data between the first control circuit and second control circuit through a first route and is provided with a first counting unit that counts a first data transfer amount between the first control circuit and second control circuit,
a second data transfer circuit transferring data between the first control circuit and second control circuit through a second route and is provided with a second counting unit that counts a second data transfer amount between the first control circuit and second control circuit, and
a system control device making the first data transfer circuit retire the first route or making the second data transfer circuit retire the second route, when the total value of the first data transfer amount and the second data transfer amount is smaller than a first threshold value, and
a clock supply unit supplying a clock to the first and second data transfer circuits, and the system control device makes the clock supply unit stop the supply of the clock to the first data transfer circuit when making the first data transfer circuit retire the first route or makes the clock supply unit stop the supply of the clock to the second data transfer circuit when making the second data transfer circuit retire the second route, and further a power supply unit stops at least the supply of power to the retired data transfer circuit when the retirement of the first or second data transfer circuit continues for a certain period.

2. The information processing apparatus according to claim 1, further comprising a power supply unit supplying power to the first and second data transfer circuits, and the system control device makes the power supply unit stop the supply of power to the first data transfer circuit when making the first data transfer circuit retire the first route or makes the power supply unit stop the supply of power to the second data transfer circuit when making the second data transfer circuit retire the second route.

3. The information processing apparatus according to claim 1, wherein the information processing apparatus makes the system control device operate either the first or second data transfer circuit retired at the first or second route when the total value of the first data transfer amount and second data transfer amount is larger than a second threshold value.

4. The information processing apparatus according to claim 1, wherein, the second threshold value is set larger than the first threshold value.

5. A method of operation of a first data transfer circuit or a second data transfer circuit in an information processing apparatus comprising a first control circuit connected to a first processing circuit and first storage circuit, a second control circuit connected to a second processing circuit and second storage circuit, an input/output control unit connected to an input/output device, a first data transfer circuit transferring data between the first control circuit, second control circuit and the input/output control unit through a first route, and a second data transfer circuit transferring data between the first control circuit, second control circuit and the input/output control unit through a second route, said method of operation comprising:

performing, for the first route, first counting processing that counts the first data transfer amount for the first control circuit, second counting processing that counts the second data transfer amount for the second control circuit, and third counting processing that counts the third data transfer amount for the input/output control unit, performing, for the second route, fourth counting processing that counts the fourth data transfer amount for the first control circuit, fifth counting processing that counts the fifth data transfer amount for the second control circuit, and sixth counting processing that counts the sixth data transfer amount for the input/output control unit, finding the average value of the first, second, third, fourth, fifth, and sixth data transfer amounts, comparing the average value and a predetermined threshold value, and making the first data transfer circuit retire the first route or making the second data transfer circuit retire the second route, when the average value is smaller than the predetermined threshold value, for the retirement, retiring the first or second route to be retired by stopping the supply of the clock to the first or second data transfer circuit and further stopping at least the supply of power to the retired first or second data transfer circuit when the retirement of the first or second data transfer circuit continues for a certain period.

6. The method of operation according to claim 5, further comprising calculating the first to sixth data transfer amounts, based on the number of valid data sets passing through counting locations of the data transfer amount, while counting a predetermined number of clocks at the counting locations.

7. The method of operation according to claim 5, wherein, for the retirement, always selecting a predetermined one of the first route and the second route.

8. The method of operation according to claim 6, wherein, for the retirement, alternately selecting the first route or the second route at each retirement.

9. A non-transitory computer readable medium having thereon recorded a program for allowing a computer to execute a method, in an information processing apparatus comprising a first control circuit connected to a first processing circuit and first storage circuit, a second control circuit connected to a second processing circuit, second storage circuit, an input/output control unit connected to an input/output device, a first data transfer circuit transferring data between the first control circuit, second control circuit and the input/output control unit through a first route, and a second data transfer circuit transferring data between the first control circuit, second control circuit and the input/output control unit through a second route, causing said first data transfer circuit or said second transfer circuit to execute the method comprising:

performing, for the first route, first counting processing that counts the first data transfer amount for the first control circuit, second counting processing that counts the second data transfer amount for the second control circuit, and third counting processing that counts the third data transfer amount for the input/output control unit, performing, for the second route, fourth counting processing that counts the fourth data transfer amount for the first control circuit, fifth counting processing that counts the fifth data transfer amount for the second control circuit, and sixth counting processing that counts the sixth data transfer amount for the input/output control unit, performing first addition processing that finds the first total value of the first data transfer amount and fourth data transfer amount, second addition processing that finds the second total value of the second data transfer amount and fifth data transfer amount, and third addition processing that finds the third total value of the third data transfer amount and sixth data transfer amount, comparing the first, second, and third total values with a predetermined threshold value, and making the first data transfer circuit retire the first route or making the second data transfer circuit retire the second route when any or the total value of all of the first, second, and third total values is smaller than the predetermined threshold value, for the retirement, retiring the first or second route to be retired by stopping the supply of the clock to the first or second data transfer circuit and further stopping at least the supply of power to the retired first or second data transfer circuit when the retirement of the first or second data transfer circuit continues for a certain period.

10. A non-transitory computer readable medium having thereon recorded a program for allowing a computer to execute a method, in an information processing apparatus comprising a first control circuit connected to a first processing circuit and first storage circuit, a second control circuit connected to a second processing circuit and second storage circuit, an input/output control unit connected to an input/output device, a first data transfer circuit transferring data between the first control circuit, second control circuit and the input/output control unit through a first route, and a second data transfer circuit transferring data between the first control circuit, second control circuit and the input/output control unit through a second route, causing said first data transfer circuit or said second transfer circuit to execute the method comprising:

performing, for the first route, first counting processing that counts the first data transfer amount for the first control circuit, second counting processing that counts the second data transfer amount for the second control circuit, and third counting processing that counts the third data transfer amount for the input/output control unit, performing, for the second route, fourth counting processing that counts the fourth data transfer amount for the first control circuit, fifth counting processing that counts the fifth data transfer amount for the second control circuit, and sixth counting processing that counts the sixth data transfer amount for the input/output control unit, finding the average value of the first, second, third, fourth, fifth, and sixth data transfer amounts, comparing the average value and a predetermined threshold value, and making the first data transfer circuit retire the first route or making the second data transfer circuit retire the second route, when the average value is smaller than the predetermined threshold value, for the retirement, retiring the first or second route to be retired by stopping the supply of the clock to the first or second data transfer circuit and further stopping at least the supply of power to the retired first or second data transfer circuit when the retirement of the first or second data transfer circuit continues for a certain period.

11. A method of operation of a first data transfer circuit or a second data transfer circuit in an information processing apparatus comprising a first control circuit connected to a first processing circuit and first storage circuit, a second control circuit connected to a second processing circuit and second storage circuit, an input/output control unit connected to an input/output device, a first data transfer circuit transferring data between the first control circuit, second control circuit and the input/output control unit through a first route, and a second data transfer circuit transferring data between the first control circuit, second control circuit and the input/output control unit through a second route, said method of operation comprising:

performing, for the first route, first counting processing that counts the first data transfer amount for the first control circuit, second counting processing that counts the second data transfer amount for the second control circuit, and third counting processing that counts the third data transfer amount for the input/output control unit, performing, for the second route, fourth counting processing that counts the fourth data transfer amount for the first control circuit, fifth counting processing that counts the fifth data transfer amount for the second control circuit, and sixth counting processing that counts the sixth data transfer amount for the input/output control unit, performing first addition processing that finds the first total value of the first data transfer amount and fourth data transfer amount, second addition processing that finds the second total value of the second data transfer amount and fifth data transfer amount, and third addition processing that finds the third total value of the third data transfer amount and sixth data transfer amount, comparing the first, second, and third total values with a predetermined threshold value, and making the first data transfer circuit retire the first route or making the second data transfer circuit retire the second route, when any or total values is smaller than the predetermined threshold value, for the retirement, retiring the first or second route to be retired by stopping the supply of the clock to the first or second data transfer circuit and further stopping at least the supply of power to the retired first or second data transfer circuit when the retirement of the first or second data transfer circuit continues for a certain period.

12. The method of operation according to claim 11, further comprising calculating the first to sixth data transfer amounts based on the number of valid data sets passing through counting locations of the data transfer amount, while counting a predetermined number of clocks at the counting locations.

13. The method of operation according to claim 11, wherein, for the retirement, always selecting a predetermined one of the first route and the second route.

14. The method of operation according to claim 11, wherein, for the retirement, alternately selecting the first route or the second route at each retirement.

* * * * *

UNITED STATES PATENT AND TRADEMARK OFFICE
CERTIFICATE OF CORRECTION

| | | |
|---|---|---|
| PATENT NO. | : 8,566,629 B2 | Page 1 of 1 |
| APPLICATION NO. | : 12/957844 | |
| DATED | : October 22, 2013 | |
| INVENTOR(S) | : Yoshihiro | |

It is certified that error appears in the above-identified patent and that said Letters Patent is hereby corrected as shown below:

In the Claims

In Column 21, Line 65, In Claim 8, delete "claim 6," and insert -- claim 5, --, therefor.

Signed and Sealed this
Twenty-eighth Day of January, 2014

Michelle K. Lee
*Deputy Director of the United States Patent and Trademark Office*